(12) United States Patent
Socha et al.

(10) Patent No.: US 8,817,041 B2
(45) Date of Patent: Aug. 26, 2014

(54) CLAMP MODE EMULATION

(75) Inventors: Henri Jonathan Socha, Redmond, WA (US); Harvinder Pal Singh, Redmond, WA (US); Jianye Lu, Redmond, WA (US); Ahmet Gurcan, Mercer Island, WA (US); Herman Widjaja, Sammamish, WA (US); Zabir Mahdi Hoque, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 13/175,969

(22) Filed: Jul. 5, 2011

(65) Prior Publication Data

US 2013/0009995 A1 Jan. 10, 2013

(51) Int. Cl.
*G06T 11/40* (2006.01)

(52) U.S. Cl.
USPC .......................................... 345/619

(58) Field of Classification Search
CPC ........ G06T 11/00; G06T 11/001; G06T 11/40
See application file for complete search history.

(56) References Cited

U.S. PATENT DOCUMENTS

| | | | |
|---|---|---|---|
| 6,005,586 A * | 12/1999 | Morita et al. | 345/624 |
| 6,184,887 B1 | 2/2001 | Rohner | |
| 6,731,299 B2 | 5/2004 | Wang et al. | |
| 6,768,492 B2 | 7/2004 | Dorbie et al. | |
| 7,151,863 B1 | 12/2006 | Bradley et al. | |
| 2002/0070947 A1 * | 6/2002 | Dorbie et al. | 345/582 |
| 2009/0079749 A1 * | 3/2009 | Saini et al. | 345/533 |
| 2010/0045670 A1 * | 2/2010 | O'Brien et al. | 345/420 |

OTHER PUBLICATIONS

Lamarche, "OpenGL ES From the Ground Up, Part 6: Textures and Texture Mapping," May 2009, retrieved on Oct. 28, 2013 from http://iphonedevelopment.blogspot.com/2009/05/opengl-es-from-ground-up-part-6__25.html.*

Clarberg, et al., "An Optimizing Compiler for Automatic Shader Bounding", Retrieved at <<http://fileadmin.cs.lth.se/graphics/research/papers/2010/oic/clarberg2010_oic.pdf>>, Proceedings of EGSR, vol. 29 No. 4, Jun. 2010, 10 Pages.

(Continued)

*Primary Examiner* — Kee M Tung
*Assistant Examiner* — Ryan D McCulley
(74) *Attorney, Agent, or Firm* — Timothy Chuma; Andrew Sanders; Micky Minhas

(57) ABSTRACT

Various technologies described herein pertain to filling a fill area of a canvas with a source visual object and/or a supplemental visual object to emulate a result of clamping the source visual object onto the fill area of the canvas. A source sub-region of a canvas is filled with the source visual object. Moreover, an extension sub-region of the canvas, which includes at least a part of the fill area outside the source sub-region, is formed based on the source sub-region of the canvas. Further, a supplemental visual object is generated by using a tiling clip on the source visual object and repeated within the extension sub-region of the canvas. The tiling clip specifies a size of the portion of the source visual object used as the supplemental visual object.

20 Claims, 20 Drawing Sheets

(56) References Cited

OTHER PUBLICATIONS

Robidoux, et al., "Fast Exact Area Image Upsampling with Natural Biquadratic Histosplines", Retrieved at <<http://gsoc.rivetsforbreakfast.com/articles/iciar-08.pdf>>, Proceedings of the 5th international conference on Image Analysis and Recognition, 2008, pp. 85-96.

Strengert, et al., "Pyramid Methods in GPU-Based Image Processing", Retrieved at <<http://www.vis.uni-stuttgart.de/ger/research/pub/pub2006/vmv06-strengert.pdf>>, 2008, 9 Pages.

Lloyd, et al., "CC Shadow Volumes", Retrieved at <<http://citeseerx.ist.psu.edu/viewdoc/download?doi=10.1.1.105.155&rep=rep1&type=pdf>>, 2004, 9 Pages.

"The Best Free Photoshop Plugins to Enhance Workflow" Retrieved at <<http://www.pxleyes.com/blog/2010/12/the-best-free-photoshop-plugins-to-enhance-workflow/>>, Retrieved Date: Mar. 16, 2011, pp. 1-9.

\* cited by examiner

CLAMP MODE EMULATION

BACKGROUND

Electronic documents can be utilized to publish and exchange information. A layout of an electronic document can preserve document appearance independent of a device on which the document is presented. For instance, a layout of the electronic document and visual appearance of each page of such electronic document can be defined within the electronic document. Moreover, an electronic document format can include rules for rendering, processing, and printing the electronic document.

Graphics rendered to a display conventionally can be converted to an electronic document format. However, functionality utilized for rendering graphics to the display may be unavailable within the electronic document format; thus, the rules for rendering, processing, and printing the electronic document included in the electronic document format can lack various rules utilized to render the graphics to the display. According to an example, a two dimensional graphics application programming interface (API) can include a specification for a clamp mode. The clamp mode can include a set of rules for extending an edge of a tile that includes content from a visual element to a perimeter of a fill area when at least a portion of the fill area is unfilled by the tile. The set of rules included in the clamp mode can extend the edge of the tile to the perimeter of the fill area by maintaining edge values and/or colors from the tile to the perimeter of the fill area. For instance, when rendered using the set of rules included in the clamp mode of the two dimensional graphics API, a rectangular tile that includes a set of vector elements can be rasterized and edge values and/or colors from the rasterized tile can be extended outwards to the perimeter of the fill area. Contrarily, an electronic document format can be unable to directly specify a clamp mode (e.g., the electronic document format can lack a set of rules for extending an edge of a tile to a perimeter of a fill area by maintaining edge values and/or colors from the tile to the perimeter of the fill area). Accordingly, a result of the clamp mode supported by the two dimensional graphics API conventionally can be emulated when the graphics rendered to the display are converted to the electronic document format by converting the tile into a raster graphics image (e.g., bitmap) and using the edge pixels from the raster graphics image for clamping. However, emulating the result of the clamp mode by converting the tile to the raster graphics image can potentially cause a detrimental impact to fidelity (e.g., since the resolution of the raster graphics image is fixed) and performance (e.g., since the raster graphics image would have to be created from the tile), while increasing a size of an electronic document (e.g., to hold the raster graphics image).

SUMMARY

Described herein are various technologies that pertain to filling a fill area of a canvas with a source visual object and/or a supplemental visual object, where the supplemental visual object can be generated from a corner or an edge of the source visual object, to emulate a result of clamping the source visual object onto the fill area of the canvas. Sub-regions of the canvas can be respectively filled with the source visual object and one or more supplemental visual objects generated from the source visual object. More particularly, a source sub-region of the canvas can be filled with the source visual object and an extension sub-region of the canvas can be filled with a corresponding supplemental visual object. The extension sub-region of the canvas can be formed based on the source sub-region of the canvas. For instance, the extension sub-region can include at least a part of a remainder of the fill area of the canvas outside the source sub-region.

A supplemental visual object generated from the source visual object can refer to a portion of the source visual object. For instance, the supplemental visual object can be generated by using a tiling clip on the source visual object. The tiling clip can specify a size of the portion of the source visual object to be used as the supplemental visual object. Further, the supplemental visual object can be repeated within a corresponding extension sub-region to fill the extension sub-region.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
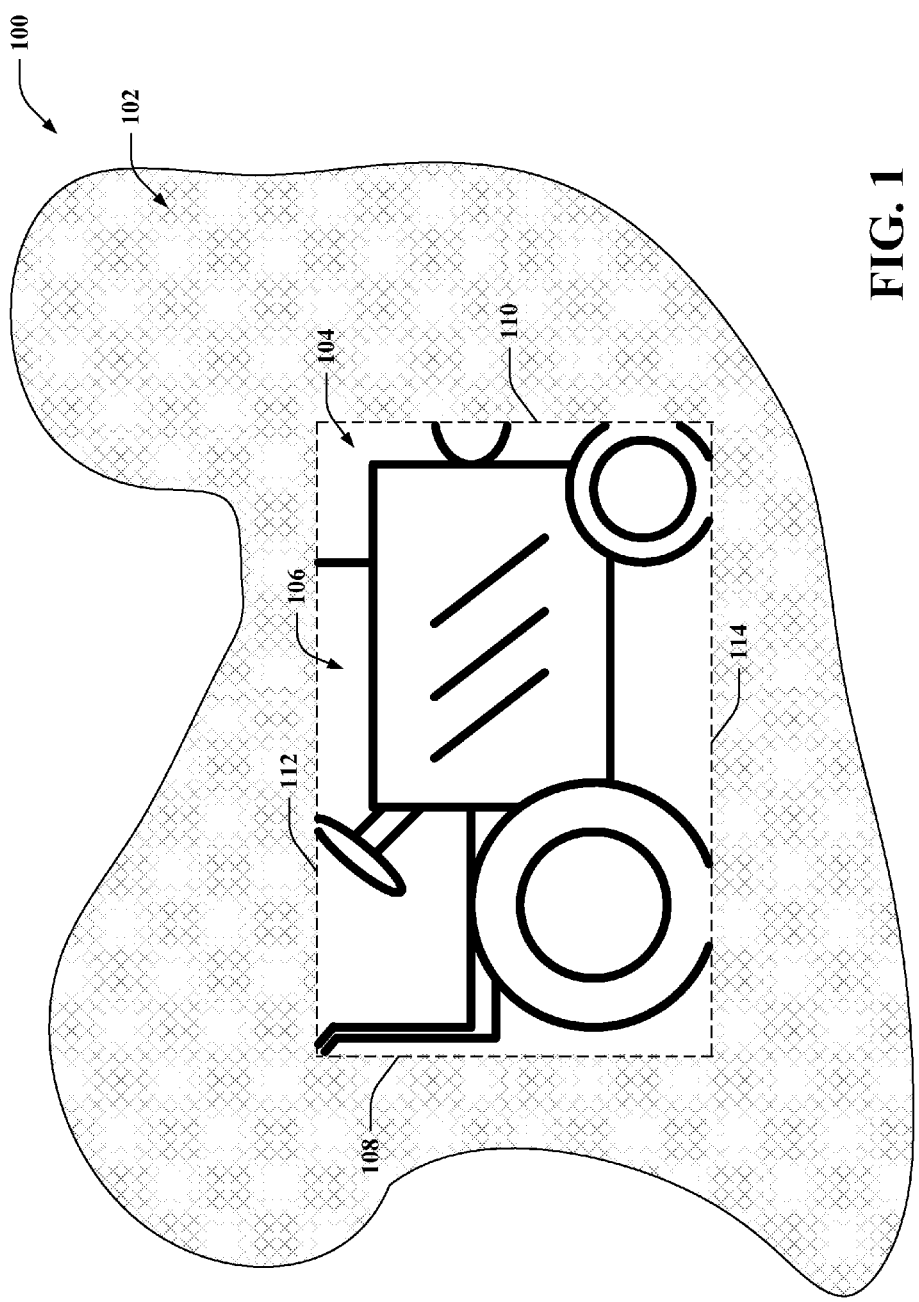
FIGS. 1-4 illustrate an exemplary canvas filled in accordance with various aspects described herein.

Various technologies pertaining to filling a fill area of a canvas with a source visual object and/or a supplemental visual object, where the supplemental visual object can be generated from a corner or an edge of the source visual object, to emulate a result of clamping the source visual object onto the fill area of the canvas are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a fill area of a canvas can be filled with a source visual object and/or a supplemental visual object. A source sub-region of the canvas can be filled with the source visual object. Moreover, an extension sub-region of the canvas can be filled with the supplemental visual object, which can be generated from a corner or an edge of the source visual object. For instance, the supplemental visual object can be replicated within the extension sub-region of the canvas.

According to an example, the canvas can be filled with the source visual object and/or the supplemental visual object when graphics rendered to a display using a set of rules included in a clamp mode of a two dimensional graphics API (e.g., a vector graphics API or a raster graphics API) are converted to an electronic document format. For instance, the set of rules included in the clamp mode of the two-dimensional graphics API can rasterize the source visual object and extend edge values and/or colors from the rasterized source visual object outwards to a perimeter of a fill area as part of the graphics rendered to the display. However, the electronic document format can lack a set of rules for extending edge values and/or colors of the source visual object to a perimeter of a fill area. Hence, the canvas filled with the source visual object and/or one or more supplemental visual objects can emulate a result of the clamp mode supported by the two-dimensional graphics API (e.g., the canvas filled with the source visual object and/or one or more supplemental visual objects can be included in an electronic document). By way of example, it is to be appreciated that the electronic document can be a fixed layout electronic document or a dynamic layout electronic document.

By way of example, the source visual object can include a set of vector elements. Following this example, when the canvas is filled with the source visual object and/or the one or more supplemental visual objects generated from the source visual object, the source visual object and/or the one or more supplemental visual objects can be maintained in a vector format (e.g., as opposed to rasterizing the source visual object and using the edge pixels for clamping). Thus, the result of the clamp mode supported by the two-dimensional graphics API can be emulated while mitigating a detrimental impact to fidelity and performance and increase in size oftentimes resulting from conventional approaches. However, it is also contemplated that the source visual object can include a raster graphics image, for example.

Referring now to the drawings, FIGS. 1-4 illustrate filling an exemplary canvas 100 in accordance with various aspects described herein. The example set forth in FIGS. 1-4 depicts filling a fill area 102 of the canvas 100 with a source visual object 104 and supplemental visual objects generated from the source visual object 104. A crosshatch included in the drawings represents an unfilled portion of the fill area 102 of the canvas 100. While the crosshatch is shown as being within a perimeter of the fill area 102 of the canvas 100, it is also contemplated that the canvas 100 can be at least partially unfilled outside the perimeter of the fill area 102. The canvas 100 filled with the source visual object 104 and the supplemental visual objects can emulate a result of clamping the source visual object 104 onto the fill area 102. It is to be appreciated that the example described in FIGS. 1-4 is provided for illustration purposes, and is not intended to limit the scope of the hereto appended claims.

As depicted in FIG. 1, the canvas 100 includes a source sub-region 106. The source sub-region 106 has a rectangular shape and is bounded by a left side 108, a right side 110, a top side 112, and a bottom side 114. The source sub-region 106 is within a perimeter of the fill area 102. However, it is contemplated that a source sub-region can be entirely or partially outside the perimeter of the fill area 102, for example. By way of further example, it is contemplated that a source sub-region can have a shape other than a rectangle (e.g., a polygon, etc.). Moreover, the source sub-region 106 is filled with the source visual object 104.

Figure 2:
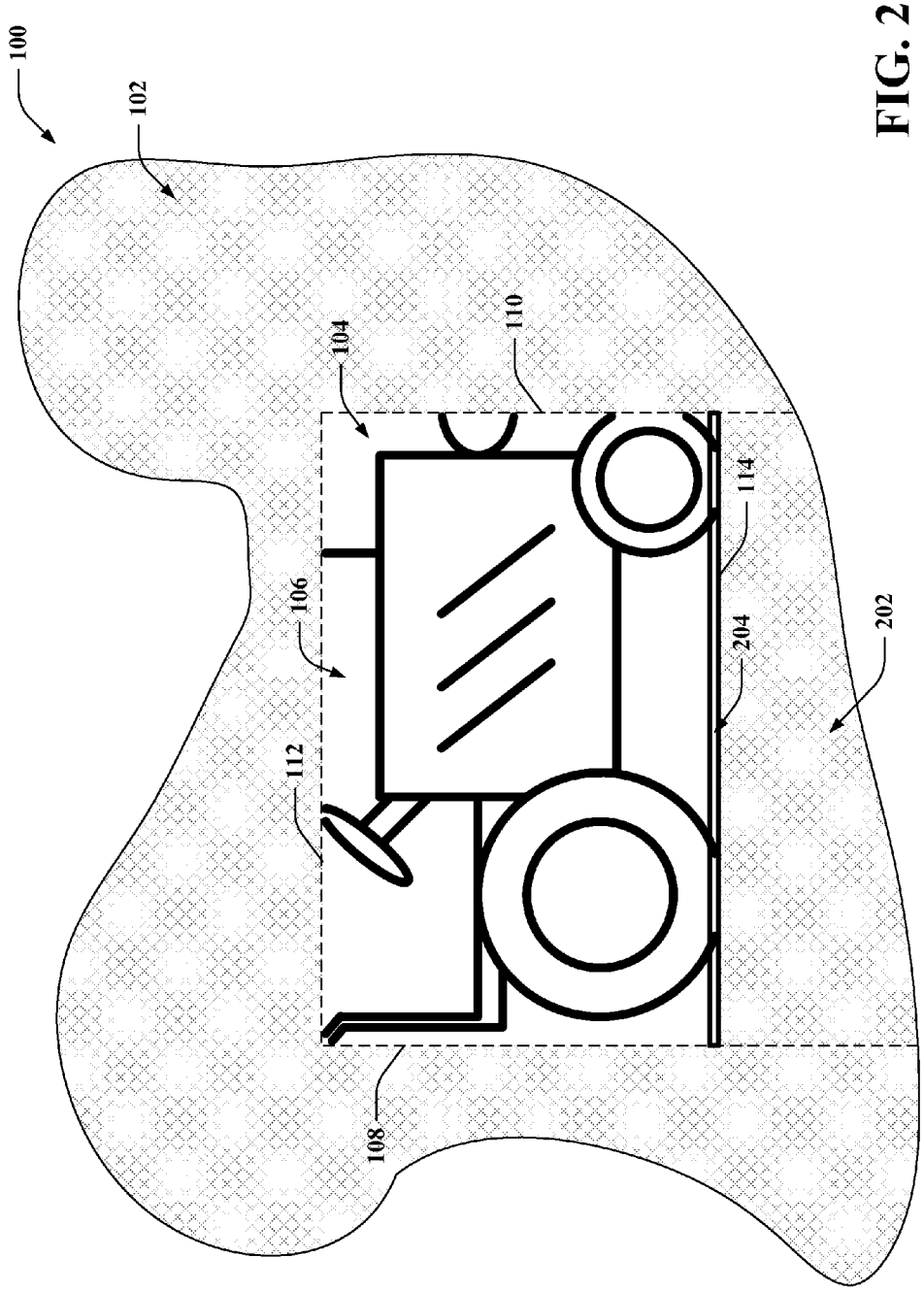

FIG. 2 illustrates an extension sub-region 202 included within the fill area 102 of the canvas 100. As depicted in FIG. 2, the left side 108 and the right side 110 of the source sub-region 106 are outwardly extended. For example, the left side 108 and the right side 110 of the source sub-region 106 can be extended outwards in cardinal directions. The extension sub-region 202 is bounded by a perimeter of the fill area 102, an extension of the left side 108 of the source sub-region 106, the bottom side 114 of the source sub-region 106, and an extension of the right side 110 of the source sub-region 106. Moreover, FIG. 2 shows the extension sub-region 202 being unfilled.

FIG. 2 also illustrates a tiling clip 204 applied to the source visual object 104. A tiling clip specifies a size of a portion of the source visual object 104 to be used as a supplemental visual object. A tiling clip can be used in the performance of tiling. The tiling clip 204 is a one-pixel high strip tiling clip that extends across a width of the source sub-region 106; however, it is to be appreciated that tiling clips with different sizes and shapes are intended to fall within the scope of the hereto appended claims. The tiling clip 204 is applied to a bottom edge of the source visual object 104 to generate a supplemental visual object to be used to fill the extension sub-region 202. Thus, the supplemental visual object to be used to fill the extension sub-region 202 is a portion of the source visual object 104 within the tiling clip 204, where the tiling clip 204 is positioned at a bottom edge of the source visual object 104.

Figure 3:
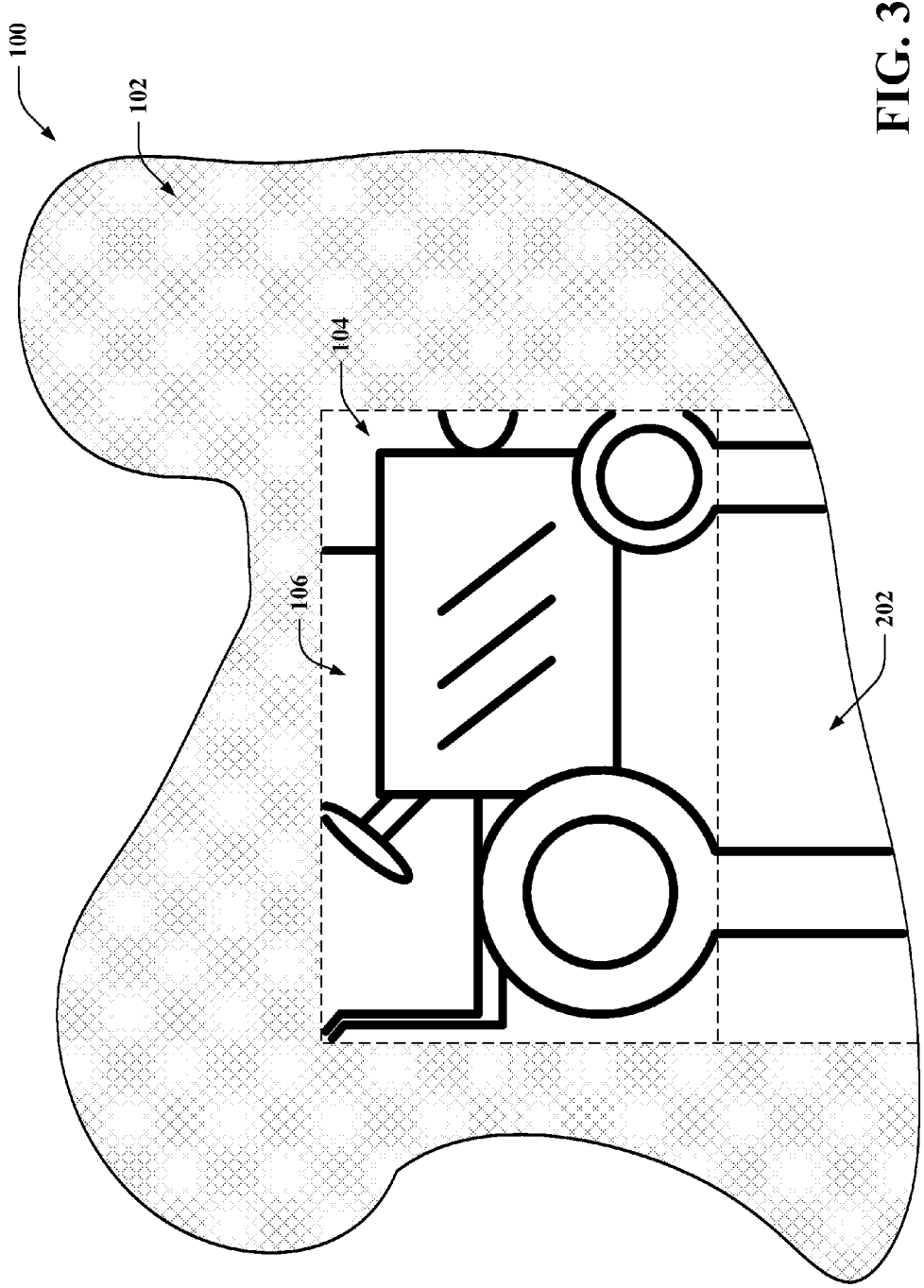

As depicted in FIG. 3, the extension sub-region 202 included within the fill area 102 of the canvas 100 is filled with the supplemental visual object generated by applying the tiling clip 204 to the bottom edge of the source visual object 104 as illustrated in FIG. 2. The extension sub-region 202 is filled by repeating the supplemental visual object in a direction perpendicular to a side of the source sub-region 106 adjacent to the extension sub-region 202 (e.g., perpendicular to the bottom side 114 of the source sub-region 106 as shown in FIG. 1). Thus, the supplemental visual object is vertically repeated throughout the extension sub-region 202.

Figure 4:
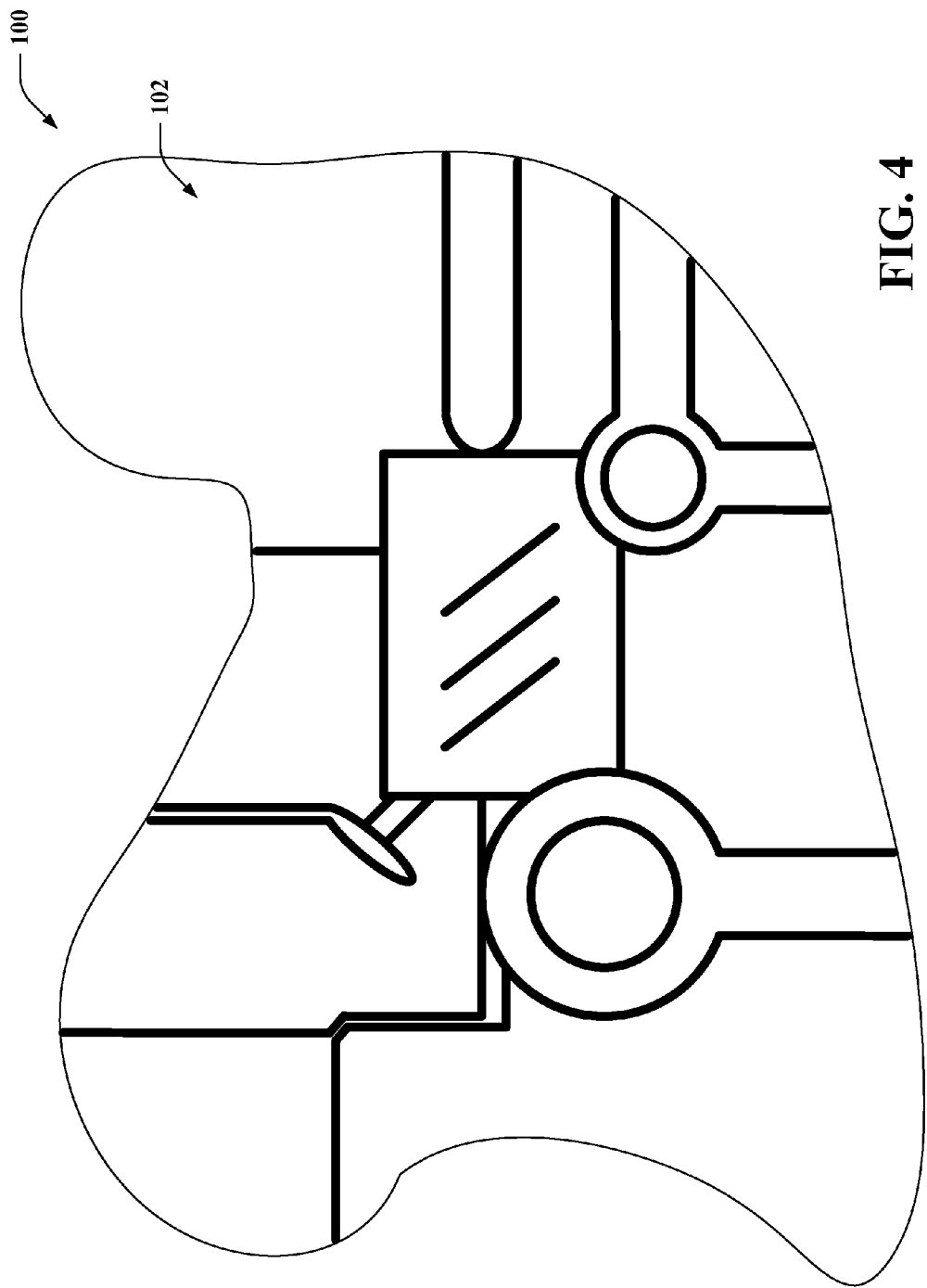

As illustrated in FIG. 4, the fill area 102 of the canvas 100 is filled with the source visual object (e.g., the source visual object 104 of FIG. 1) and supplemental visual objects generated from the source visual object. Similar to the example set forth in FIGS. 2-3, extension sub-regions other than the extension sub-region 202 within the fill area 102 of the canvas 100 are filled with respective supplemental visual objects generated from the source visual object.

Figure 5:
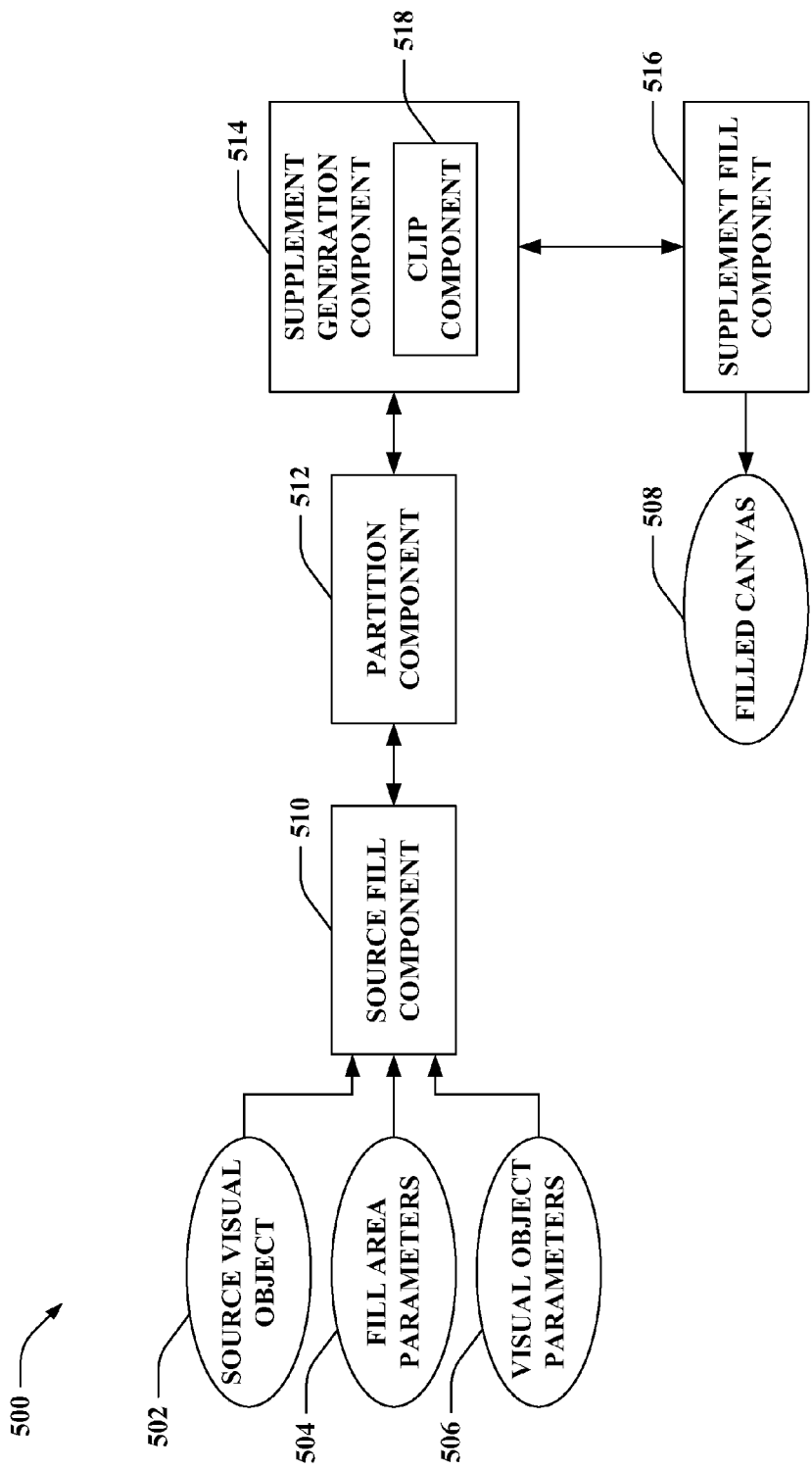
FIG. 5 illustrates a functional block diagram of an exemplary system that fills a fill area of a canvas with a source visual object and/or one or more supplemental visual objects generated from the source visual object to emulate a result of clamping the source visual object onto the fill area of the canvas.

Now turning to FIG. 5, illustrated is a system 500 that fills a fill area of a canvas with a source visual object 502 and/or one or more supplemental visual objects generated from the source visual object 502 to emulate a result of clamping the source visual object 502 onto the fill area of the canvas. The fill area can have a perimeter with an arbitrary shape. The perimeter of the fill area and/or a position of the fill area on a canvas can be specified by fill area parameters 504. The source visual object 502 and the fill area parameters 504 can be inputted to the system 500. Further, visual object parameters 506 related to the source visual object 502 can be inputted to the system 500. The system 500 can fill the fill area of the canvas with visual objects to generate a filled canvas 508 based at least in part upon the source visual object 502, the fill area parameters 504, and the visual object parameters 506, where the filled canvas 508 can emulate a result of a clamp mode.

The filled canvas 508 generated by the system 500 can be a resource associated with a page of an electronic document. For instance, the system 500 can be employed when calls that specify clamp mode (e.g., as part of a format that natively supports clamp mode functionality) are serialized to an electronic document format; thus, the calls can be converted into a format that can be stored, for example, in a file or memory buffer. The system 500 emulates the result of clamping since functionality associated with clamp mode is not natively supported within the electronic document format (e.g., the electronic document format lacks a set of rules for extending edge values and/or colors of the source visual object 502 to a perimeter of the fill area). Moreover, the filled canvas 508 can be displayed on an electronic display screen, printed via a printer, retained in a data store, or the like.

The system 500 can append the source visual object 502 and one or more visual objects hierarchically produced from the source visual object 502 to the fill area of the canvas to generate the filled canvas 508. A visual object can be hierarchically produced from the source visual object 502 by referring to a portion of the source visual object 502. A portion of the fill area of the filled canvas 508 can be filled with the source visual object 502 and a remainder of the fill area of the filled canvas 508 can be filled with the one or more visual objects hierarchically produced from the source visual object 502. The one or more visual objects hierarchically produced from the source visual object 502 can be referred to herein as supplemental visual objects. Although many of the examples described herein pertain to adding the source visual object 502 to the fill area of the filled canvas 508, it is contemplated that the source visual object 502 need not be added to the fill area of the filled canvas 508 (e.g., the visual object parameters 506 can specify a location for the source visual object 502 that is outside a perimeter of the fill area on the filled canvas 508).

The system 500 includes a source fill component 510 that receives the source visual object 502, the fill area parameters 504, and the visual object parameters 506. Upon receiving the foregoing inputs, the source fill component 510 can generate an empty canvas. Alternatively, an empty canvas can be provided to the source fill component 510. Further, the source fill component 510 can initiate filling the empty canvas. More particularly, the source fill component 510 can determine a source sub-region of the canvas from the visual object parameters 506. The source sub-region of the canvas is an area of the canvas to be filled with the source visual object 502. The source sub-region can be entirely or partially within the fill area specified by the fill area parameters 504; however, it is contemplated that the source sub-region can be outside the fill area specified by the fill area parameters 504. Moreover, the source fill component 510 can fill the source sub-region of the canvas with the source visual object 502.

The source visual object 502 can include, for example, a set of vector elements (e.g., vector primitives) or a raster graphics image. Examples of vector elements include, but are not limited to, points, lines, line segments, polygons, curves, circles, and ellipses; however, it is to be appreciated that the claimed subject matter is not so limited. For instance, if the source visual object 502 includes a set of vector elements, then mathematical formulas can be used to represent the vector elements. Such formulas are not dependent on resolution, thereby allowing for scaling to arbitrary dimensions. Yet, it is to be appreciated that the source visual object 502 can be treated similarly within the system 500 regardless whether the source visual object 502 includes a set of vector elements or a raster graphics image.

The visual object parameters 506 inputted to the source fill component 510 include parameters related to the portion of the canvas to be filled with the source visual object 502. The visual object parameters 506 include a fill origin and a destination geometry area for the source visual object 502. A shape of the destination geometry area for the source visual object 502 can be a rectangle. The fill origin can indicate a location of a top-left corner of the rectangle on the canvas, and the destination geometry area can indicate a height and width of the rectangle. However, it is to be appreciated that the fill origin can indicate a location of a disparate corner of the rectangle or any other part of the rectangle (e.g., a midpoint of a side of the rectangle, etc.) on the canvas.

The fill origin and the destination geometry area specify the source sub-region of the canvas, and hence, the source fill component 510 can determine the source sub-region of the canvas as a function of such parameters. As determined by the source fill component 510, the source sub-region can be at least partially within the fill area described by the fill area parameters 504, for example; thus, the source sub-region can be a portion of the fill area. However, it is also contemplated that the source sub-region can be outside the fill area described by the fill area parameters 504. For instance, as compared to the example shown in FIG. 1 where the source sub-region 106 is within the perimeter of the fill area 102, it is to be appreciated that the source sub-region 106 can be partially or completely outside the perimeter of the fill area 102.

According to another example, the visual object parameters 506 can include an affine transformation (e.g., instead of or in addition to the fill origin and the destination geometry area for the source visual object 502). Following this example, an inverse of the affine transformation can be applied to the fill area such that a coordinate system axis can be aligned to the source visual object 502. Further, after sub-region(s) of the fill area are calculated and filled as described herein, the sub-regions(s) of the fill area can be transformed using the affine transformation. Yet, it is to be appreciated that the claimed subject matter is not limited to use of such affine transformation.

Moreover, the source fill component 510 can fill the source sub-region of the canvas with the source visual object 502. For instance, the visual object parameters 506 can further include a source origin and a source geometry area. The source origin and the source geometry area can be inputted to the source fill component 510 to specify an area from the source visual object 502 used for filling (e.g., a portion or an entire area of the source visual object 502 can be used for filling the source sub-region of the canvas by the source fill component 510). Thus, for instance, a clip can be applied to the source visual object 502, and the source visual object 502 with the clip applied thereto can be used as a brush for filling the source sub-region of the canvas by the source fill component 510; moreover, it is to be appreciated that such clip can have an arbitrary shape and need not be limited to being a rectangle. Similar to the destination geometry area, a shape of the source geometry area can be a rectangle and the destination geometry area can indicate a height and width of the rectangle. Moreover, the source origin can indicate a location of a top-left corner of the rectangle within the area of the source visual object 502 used for filling; yet, it is further contemplated that the source origin can indicate a location of a disparate corner or any other part of the rectangle within the area of the source visual object 502 used for filling. It is also further to be appreciated that the claimed subject matter is not limited to use of the source origin and the source geometry parameters. According to another example, it is contemplated that a skew transform can be applied on a brush used for filling the source sub-region of the canvas (e.g., a skew transform can be applied to the portion or the entire area of the source visual object 502 used for filling the source sub-region of the canvas).

The system 500 further includes a partition component 512 that forms one or more extension sub-regions of the canvas based on the source sub-region of the canvas. The one or more extension sub-regions can be formed within the fill area of the canvas. Further, the one or more extension sub-regions can be formed in a remainder of the fill area of the canvas outside the source sub-region. An extension sub-region is an area within the fill area of the canvas to be filled with a supplemental visual object hierarchically produced from the source visual object 502. Accordingly, a particular extension sub-region formed by the partition component 512 can comprise at least a part of a remainder of the fill area of the canvas outside the source sub-region. Further, the particular extension sub-region can be contiguous with the perimeter of the fill area of the canvas and the source sub-region. The partition component 512 can form the one or more extension sub-regions in the remainder of the fill area of the canvas outside the source sub-region by outwardly extending sides of the source sub-region for example in cardinal directions. By way of example, if the source sub-region is within and not contiguous with a perimeter of the fill area of the canvas, then the remainder of the fill area of the canvas outside the source sub-region can be divided into eight extension sub-regions by the partition component 512 (e.g., four extension sub-regions can be positioned in non-cardinal directions with respect to the source sub-region and four extension sub-regions can be positioned in cardinal directions with respect to the source sub-region). However, depending upon a position of the source sub-region with respect to the perimeter of the fill area of the canvas, the remainder of the fill area outside the source sub-region can be divided into fewer than eight extension sub-regions by the partition component 512.

For example, if a bottom side of the source sub-region is outside the perimeter of the fill area of the canvas, a left side and a right side of the source sub-region are partially within the perimeter of the fill area of the canvas, and a top side of the source sub-region is within the perimeter of the fill area of the canvas, then the remainder of the fill area of the canvas outside the source sub-region can be divided into five extension sub-regions by the partition component 512 (e.g., three extension sub-regions can be positioned in cardinal directions with respect to the source sub-region and two extension sub-regions can be positioned in non-cardinal directions with respect to the source sub-region). By way of another example, if a bottom side and a left side of the source sub-region are outside the perimeter of the fill area of the canvas, and a top side and a right side of the source sub-region are partially within the perimeter of the fill area of the canvas, then the remainder of the fill area of the canvas outside the source sub-region can be divided into three extension sub-regions by the partition component 512 (e.g., two extension sub-regions can be positioned in cardinal directions with respect to the source sub-region and one extension sub-region can be positioned in a non-cardinal direction with respect to the source sub-region). In accordance with another example, if the source sub-region is positioned below the perimeter of the fill area (e.g., the source sub-region 106 of FIG. 1 is vertically shifted downwards to be outside the perimeter of the fill area 102 but not horizontally shifted), then the remainder of the fill area of the canvas outside the source sub-region can be divided into three extension sub-regions by the partition component 512 (e.g., two extension sub-regions can be positioned in non-cardinal directions with respect to the source sub-region and one extension sub-region can be positioned in a cardinal direction with respect to the source sub-region).

A cardinal direction is a direction along a vertical axis or a direction along a horizontal axis. Moreover, a non-cardinal direction is a direction between cardinal directions with horizontal and vertical components. Although extension sub-regions positioned in cardinal and non-cardinal directions are described herein, it is to be appreciated that the extension sub-regions can be positioned in other directions with respect to the source sub-region. Moreover, according to another embodiment, it is contemplated that an extension sub-region described herein can be split into a plurality of extension sub-regions; thus, the partition component 512 can form more than eight extension sub-regions.

The system 500 further includes a supplement generation component 514 and a supplement fill component 516. The supplement generation component 514 generates one or more supplemental visual objects from the source visual object 502. The supplement generation component 514 can create a respective supplemental visual object for each extension sub-region formed by the partition component 512. Moreover, the supplement fill component 516 fills the one or more extension sub-regions formed by the partition component 512 with the respective supplemental visual objects created by the supplement generation component 514. For example, if the partition component 512 divides the remainder of the fill area of the canvas outside the source sub-region into eight extension sub-regions, then the supplement generation component 514 can generate eight supplemental visual objects. Following this example, the supplement fill component 516 can fill a first extension sub-region from the eight extension sub-regions with a corresponding first supplemental visual object from the eight supplemental visual objects, a second extension sub-region from the eight extension sub-regions with a corresponding second supplemental visual object from the eight supplemental visual objects, and so forth. It is to be appreciated, however, that the claimed subject matter is not limited to the foregoing example.

The supplement generation component 514 generates a supplemental visual object using a tiling clip on the source visual object 502. The tiling clip specifies a size of a portion of the source visual object 502 used as the supplemental visual object. The tiling clip is a geometric shape with a given size, where the given size specifies the size of the portion of the source visual object 502 used as the supplemental visual object. According to an example, the tiling clip can be a square or rectangle; however, it is to be appreciated that the claimed subject matter is not so limited. Moreover, the supplement generation component 514 applies the tiling clip to a location within the source visual object 502 filled onto the source sub-region of the canvas. Thus, the supplemental visual object created by the supplement generation component 514 refers to a portion of the source visual object 502 filled onto the source sub-region of the canvas with the size specified by the tiling clip (e.g., within a perimeter of the tiling clip) and the location set by the supplement generation component 514.

The supplement generation component 514 can further include a clip component 518 that generates one or more tiling clips that can be employed by the supplement generation component 514. The clip component 518 can generate the one or more tiling clips as a function of the source sub-region (e.g., as a function of a size and a resolution of the source sub-region); hence, the clip component 518 can set sizes for the one or more tiling clips. For example, the clip component 518 can generate a one-pixel high by one-pixel wide tiling clip with a height corresponding to a height of one pixel in the source sub-region and a width corresponding to a width of one pixel in the source sub-region. According to another example, the clip component 518 can generate a one-pixel wide strip tiling clip with a width corresponding to a width of one pixel in the source sub-region and a height corresponding to a height of the source sub-region. By way of further example, the clip component 518 can generate a one-pixel high strip tiling clip with a height corresponding to a height of one pixel in the source sub-region and a width corresponding to a width of the source sub-region. A one-pixel wide strip tiling clip or a one-pixel high strip tiling clip is generally referred to as a one-pixel strip tiling clip.

One or more tiling clips generated by the clip component 518 can be employed by the supplement generation component 514. The tiling clip utilized by the supplement generation component 514 for generating a supplemental visual object can be a function of a relative position of an extension sub-region to be filled with the supplemental visual object with respect to the source sub-region. For instance, a one-pixel high by one-pixel wide tiling clip can be utilized by the supplement generation component 514 on the source visual object 502 to generate a supplemental visual object for an extension sub-region that is located in a non-cardinal direction with respect to the source sub-region. Moreover, a one-pixel strip tiling clip (e.g., a one-pixel wide strip tiling clip or a one-pixel high strip tiling clip) can be utilized by the supplement generation component 514 on the source visual object 502 to generate a supplemental visual object for an extension sub-region that is located in a cardinal direction with respect to the source sub-region. For example, the supplement generation component 514 can use a disparate tiling clip from the one or more tiling clips on the source visual object 502 to respectively generate each of the supplemental visual objects (e.g., a different tiling clip can be generated by the clip component 518 for each supplemental visual object). According to another example, at least two of the supplemental visual objects can be generated using a common tiling clip from the one or more tiling clips on the source visual object 502 (e.g., the common tiling clip can be applied to a first location for a first supplemental visual object and a second location for a second supplemental visual object).

Moreover, the location within the source visual object 502 at which the tiling clip is applied by the supplement generation component 514 can be a function of a relative position of an extension sub-region to be filled with the supplemental visual object with respect to the source sub-region. The supplement generation component 514, for instance, can apply the tiling clip (e.g., a one-pixel high by one-pixel wide tiling clip) to a corner of the source visual object 502 when the extension sub-region is located in a non-cardinal direction with respect to the source sub-region. The corner to which the tiling clip is applied is a corner of the source visual object 502 adjacent to the extension sub-region when the source sub-region is filled with the source visual object 502. Further, the supplement generation component 514 can apply the tiling clip (e.g., a one-pixel strip tiling clip) to an edge of the source visual object 502 when the extension sub-region is located in a cardinal direction with respect to the source sub-region. The edge to which the tiling clip is applied is an edge of the source visual object 502 adjacent to the extension sub-region when the source sub-region is filled with the source visual object 502.

The supplement fill component 516 can fill the one or more extension sub-regions formed by the partition component 512 with the one or more supplemental visual objects generated by the supplement generation component 514 to output the filled canvas 508. The supplement fill component 516 can repeat the one or more supplemental visual objects within the one or more extension sub-regions. For example, a particular extension sub-region (e.g., located in a non-cardinal direction with respect to the source sub-region) can be filled with a supplemental visual object generated by the supplement generation component 514 using a one-pixel high by one-pixel wide tiling clip by repeating the supplemental visual object in two directions (e.g., repeat both horizontally and vertically) throughout the particular sub-region. According to another example, a particular extension sub-region (e.g., located in a cardinal direction with respect to the source sub-region) can be filled with a supplemental visual object generated by the supplement generation component 514 using a one-pixel strip tiling clip by repeating the supplemental visual object throughout the particular extension sub-region in a direction perpendicular to a side of the source sub-region adjacent to the particular extension sub-region (e.g., repeat either horizontally or vertically).

The system 500 can form, fill, etc. the source sub-region and the extension sub-region(s) to output the filled canvas 508. After the source visual object 502 and the supplemental visual objects have been appended to the canvas, a single global transform can be applied to the filled canvas 508. Hence, the filled canvas 508 is a grouping of visual objects that can be acted upon as a single visual object. For instance, the system 500 can generate the filled canvas 508, and a single transform can be applied to the filled canvas 508 to resize the filled canvas 508 to a particular page of an electronic document rather than having to apply separate transforms to the visual objects of the filled canvas 508.

According to a further example, if the source visual object 502 is inputted to the system 500 in a vector format (e.g., including a set of vector elements), then it need not be rasterized in the system 500. Rather, the source visual object 502 appended to the filled canvas 508, along with the supplemental visual object(s) that refer to the source visual object 502 which are also appended to the filled canvas 508, can be maintained in a vector format. Since the source visual object 502 and the supplemental visual object(s) can be retained in a vector format (e.g., within an electronic document), fidelity can be maintained, even when zoomed to sub-pixel level. For instance, the extension sub-regions and the source sub-region can be calculated at sub-pixel level using floating point arithmetic, while the tiling clips with dimension(s) in pixels can be employed (e.g., a one-pixel high by one-pixel wide tiling clip or a one-pixel strip tiling clip can be utilized when zoomed).

As described herein, the system 500 can fill the fill area to output the filled canvas 508, which can be part of an electronic document, to emulate a result of a clamp of the source visual object 104 onto the fill area. For example, the system 500 can emulate a result of a clamp mode supported by a two dimensional graphics API where a tile that includes content from a visual element is clamped to a fill area. Thus, if a tile that is clamped to a fill area using the clamping functionality provided by the two dimensional graphics API is converted to an electronic document format, the system 500 can be employed to replicate the clamping functionality available with the two dimensional graphics API. Accordingly, the visual element can be inputted to the system 500 as the source visual object 502. Moreover, a parameter specifying the fill area to which the tile that includes content from the visual element is clamped can be inputted to the system 500 as the fill area parameters 504. Based at least in part upon the foregoing inputs, the system 500 can generate the filled canvas 508. Yet, it is to be appreciated that the claimed subject matter is not limited to the foregoing conversion.

Figure 6:
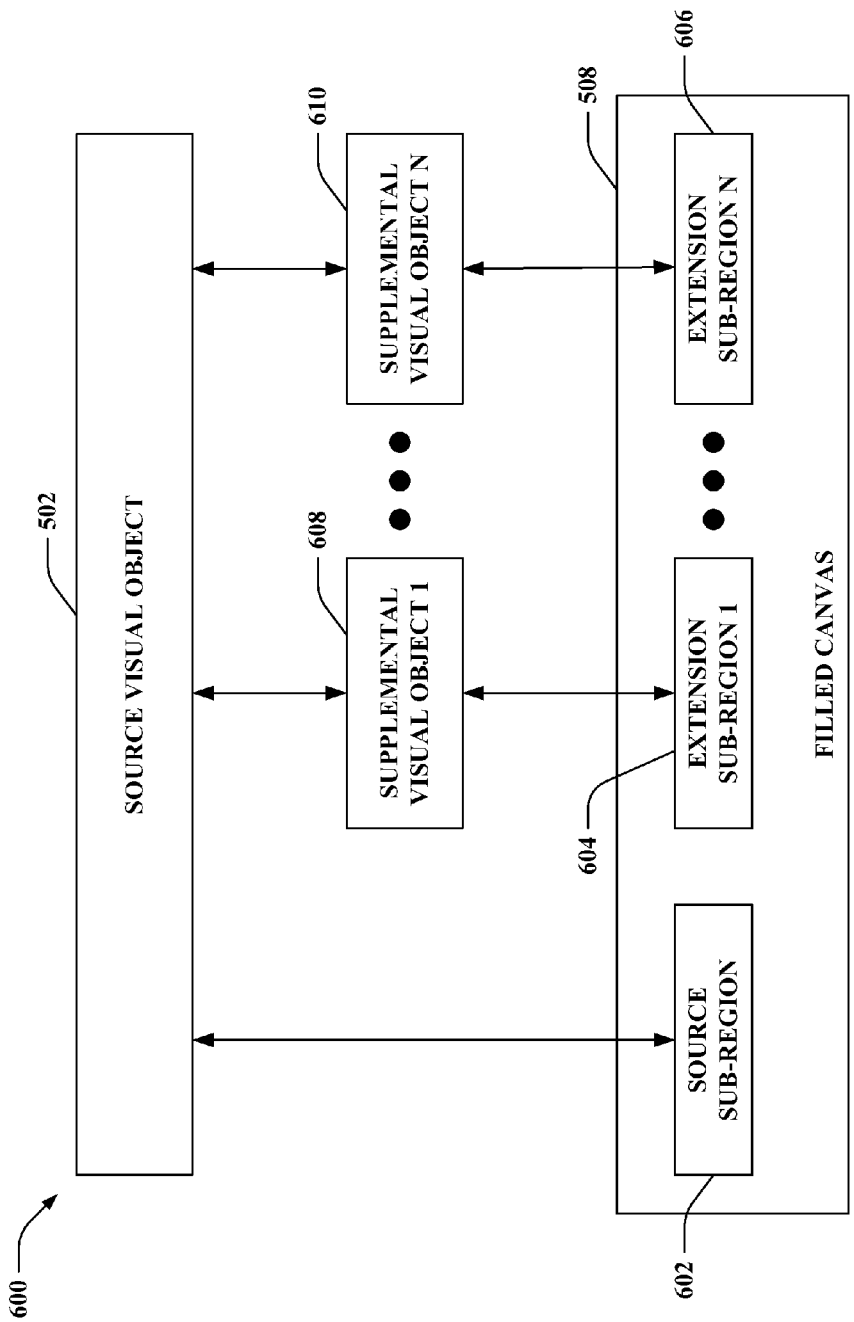
FIG. 6 illustrates an exemplary schematic diagram that depicts a hierarchical relationship between visual objects used to fill sub-regions of a filled canvas.

With reference to FIG. 6, illustrated is an exemplary schematic diagram 600 that depicts a hierarchical relationship between visual objects used to fill sub-regions of the filled canvas 508. In the schematic diagram 600, the filled canvas 508 includes a source sub-region 602 and N extension sub-regions (e.g., extension sub-region 1 604, . . . , and extension sub-region N 606), where N can be an integer less than or equal to eight; however, it is to be appreciated that the claimed subject matter is not so limited and N can be an integer greater than eight. The extension sub-region 1 604, . . . , and the extension sub-region N 606 are collectively referred to as extension sub-regions 604-606. The extension sub-regions 604-606 are located within the fill area of the filled canvas 508. The source sub-region 602 can be located at least partially within the fill area of the filled canvas 508; however, it is contemplated that the source sub-region 602 can be positioned outside the fill area of the filled canvas 508. For example, a portion of the source sub-region 602 located inside the fill area of the filled canvas 508 can be visible while a portion of the source sub-region 602 located outside the fill area of the filled canvas 508 can be concealed; however, the claimed subject matter is not limited to the foregoing example. Further, although N (e.g., more than one) extension sub-regions 604-606 are depicted, it is to be appreciated that the filled canvas 508 can include one extension sub-region.

According to the example shown, the source sub-region 602 is filled with the source visual object 502, the extension sub-region 1 604 is filled with a supplemental visual object 1 608, . . . , and the extension sub-region N 606 is filled with a supplemental visual object N 610. The supplemental visual object 1 608, . . . , and the supplemental visual object N 610 are collectively referred to as supplemental visual objects 608-610. The supplemental visual object 1 608 can be repeated throughout the extension sub-region 1 604, . . . , and the supplemental visual object N 610 can be repeated throughout the extension sub-region N 610. Moreover, the source visual object 502 need not be repeated in the source sub-region 602.

The supplemental visual objects 608-610 each logically point to a respective portion of the source visual object 502 filled onto the source sub-region 602. For example, the supplemental visual object 1 608 can point to a top-left corner pixel of the source visual object 502 filled onto the source sub-region 602 and the supplemental visual object N 610 can point to a one-pixel wide strip at a right edge of the source visual object 502 filled onto the source sub-region 602. According to this example, the extension sub-region 1 604 can be filled with the top-left corner pixel of the source visual object 502 as filled onto the source sub-region 602 and the extension sub-region N 606 can be filled with the one-pixel wide strip at the right edge of the source visual object 502 as filled onto the source sub-region 602. According to another embodiment, the supplemental visual objects 608-610 can each be a copy of a respective portion of the source visual object 502 filled onto the source sub-region 602.

The source visual object 502 and the supplemental visual objects 608-610 can be grouped together within the filled canvas 508. Thus, the filled canvas 508 can be a higher level visual object that comprises a plurality of lower level visual objects (e.g., the source visual object 502 and the supplemental visual objects 608-610). For instance, a single transform can be applied to the filled canvas 508. By way of further example, the filled canvas 508 can include eight extension sub-regions (e.g., N equals eight). Accordingly, eight supplemental visual objects can be hierarchically created (e.g., by the supplement generation component 514 of FIG. 5) from the source visual object 502. The eight supplemental visual objects can be hierarchically created by referring to respective portions of the source visual object 502. The eight supplemental visual objects can be grouped together with the source visual object 502 within the filled canvas 508. Following this example, the filled canvas 508 is a collection of the source visual object 502 and the eight supplemental visual objects that can be acted upon as a single visual object.

Figure 7:
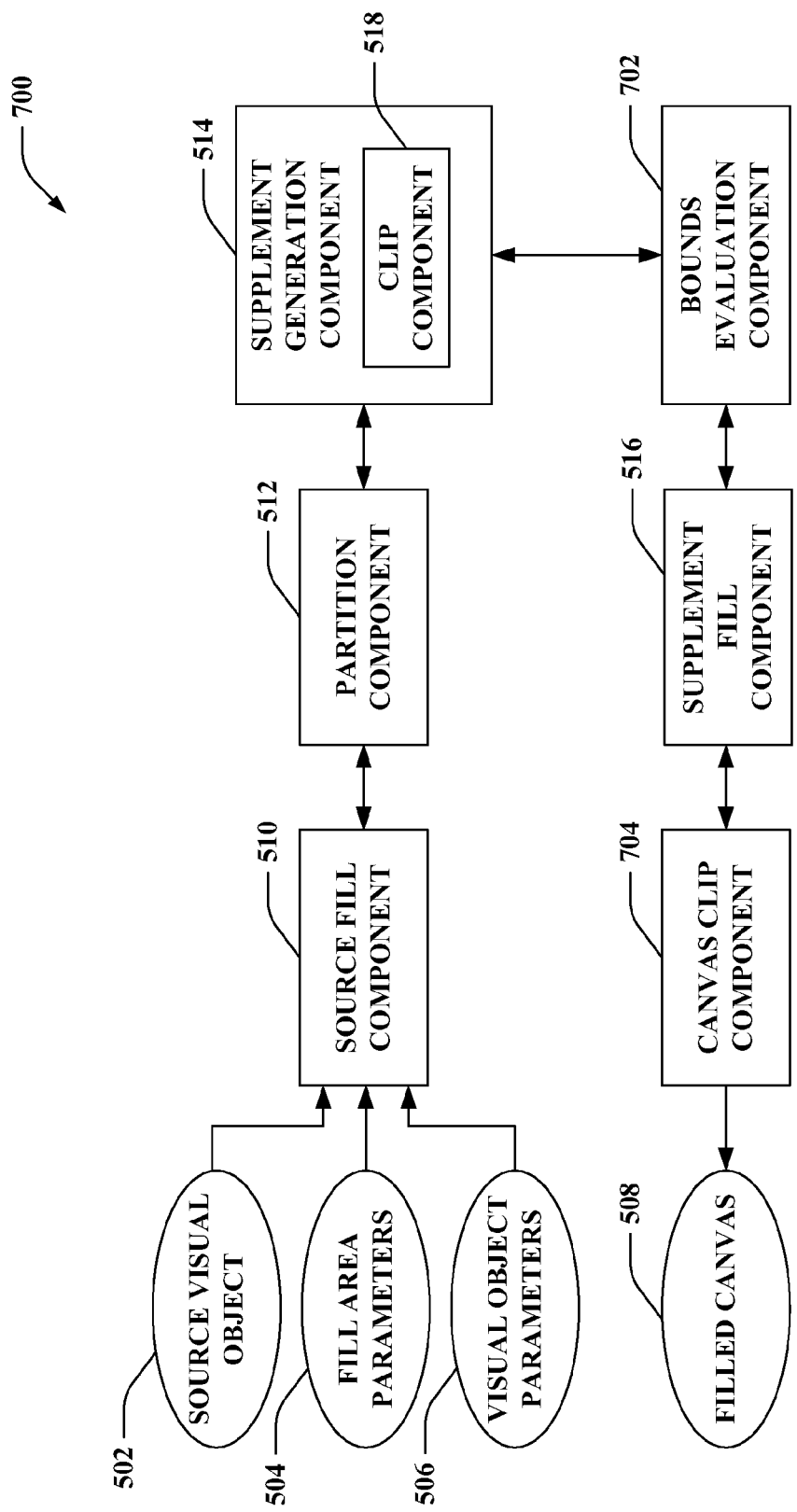
FIG. 7 illustrates a functional block diagram of an exemplary system that fills a fill area with the source visual object and one or more supplemental visual objects to emulate a result of clamping the source visual object onto the fill area.

Now turning to FIG. 7, illustrated is a system 700 that fills a fill area with the source visual object 502 and one or more supplemental visual objects to emulate a result of clamping the source visual object 502 onto the fill area. The system 700 includes the source fill component 510, which obtains the source visual object 502, the fill area parameters 504, and the visual object parameters 506. The source fill component 510 can identify a source sub-region of a canvas from the visual object parameters 506, and fill the source sub-region with the source visual object 502. Moreover, the partition component 512 can extend sides of the source sub-region outwards in cardinal directions to form one or more extension sub-regions in a remainder of a fill area of the canvas specified by the fill area parameters 504 outside of the source sub-region. Further, the supplement generation component 514 can employ one or more tiling clips generated by the clip component 518 on the source visual object 502 to generate one or more supplemental visual objects.

The system 700 further includes a bounds evaluation component 702 that can identify a perimeter of a bounding box of the fill area. For example, the bounds evaluation component 702 can determine the perimeter of the bounding box of the fill area based on the fill area parameters 504. Moreover, the bounds evaluation component 702 can generate respective estimates of the one or more extension sub-regions based on the perimeter of the bounding box of the fill area. For instance, the bounds evaluation component 702 can generate the respective estimates of the one or more extension sub-regions from intersections of the extended sides of the source sub-region and the perimeter of the bounding box of the fill area. Further, the supplement fill component 516 can fill the respective estimates of the one or more extension sub-regions with the respective supplemental visual objects generated by the supplement generation component 514. When filling a particular extension sub-region with a supplemental visual object, the supplement fill component 516 can repeat the supplemental visual object to the perimeter of the bounding box of the fill area. For instance, a canvas can extend without bounds; thus, the perimeter of the bounding box of the fill area can supply bounds within which the supplemental visual object can be repeated.

Moreover, the system 700 includes a canvas clip component 704 that applies a canvas clip that specifies a shape of the fill area to the canvas. The canvas clip is a region with a shape of the fill area used to identify a portion of the canvas that is inside the fill area. For instance, the canvas clip can be applied to identify respective portions of the respective estimates of the one or more extension sub-regions filled with the respective supplemental visual objects within the fill area. The canvas clip component 704 can generate the canvas clip based upon the fill area parameters 504. Accordingly, the respective estimates of the one or more extension sub-regions filled with the respective visual objects can be clipped to the shape of the fill area by the canvas clip component 704, thereby outputting the filled canvas 508. Filling the respective estimates of the one or more extension sub-regions with the respective visual objects and generating the filled canvas 508 by clipping the shape to the fill area using the canvas clip can be less complex, faster, etc. as compared to filling the one or more extension sub-regions with the respective visual objects (e.g., without using the canvas clip) due to the arbitrary shape of the perimeter of the fill area. Although the foregoing examples describe the estimates of the one or more extension sub-regions being bounded by the perimeter of the bounding box of the fill area, it is to be appreciated that the estimates of the one or more extension sub-regions can be unbounded (e.g., the estimates can have infinite bounds) or bounded by a perimeter of a canvas (e.g., canvas bounds) or a perimeter of a portion of the canvas (e.g., clip bounds).

Figure 8:
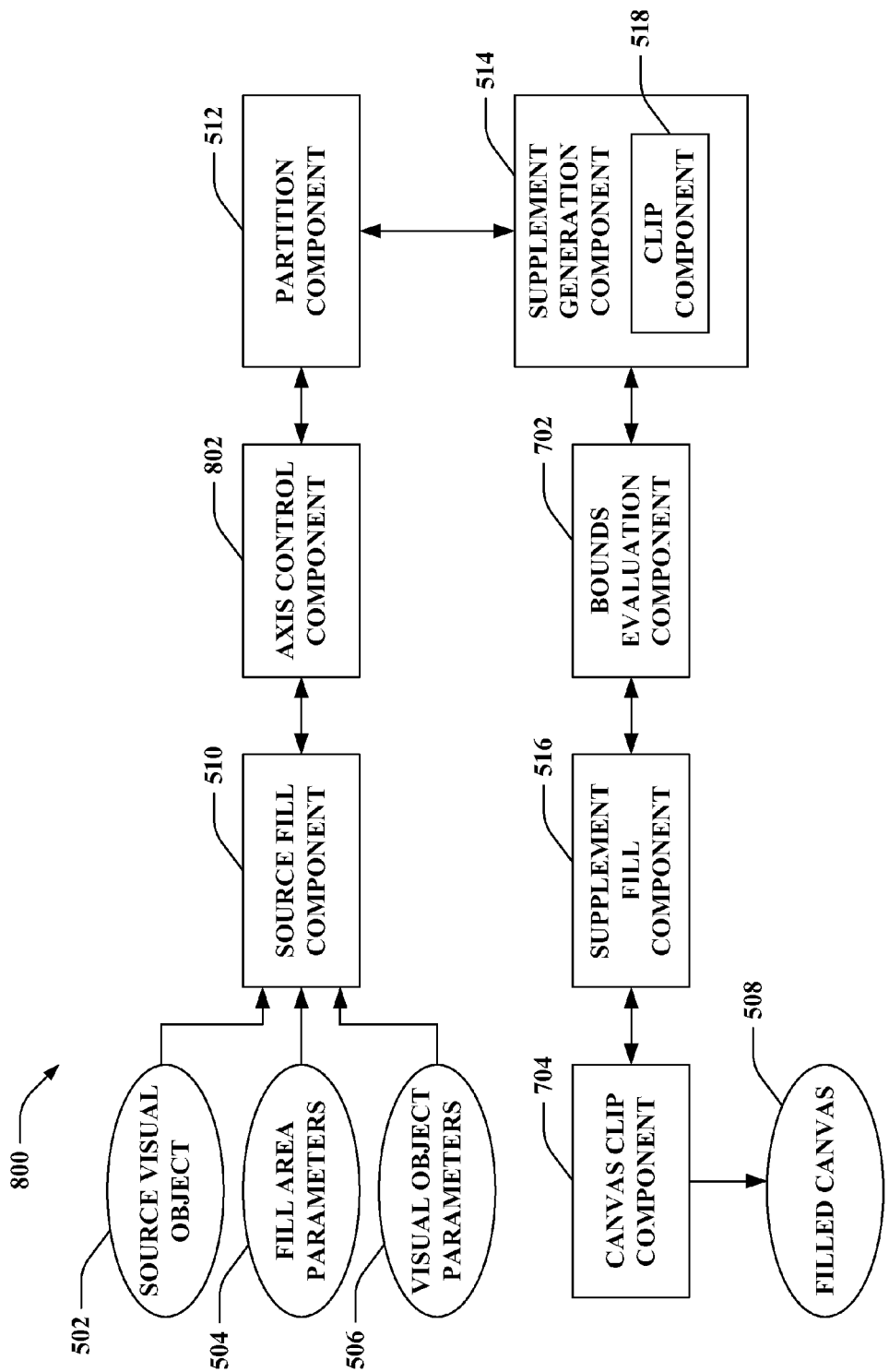
FIG. 8 illustrates a functional block diagram of an exemplary system that supports single and multiple axis emulation of a result of clamping a source visual object onto a fill area.

With reference to FIG. 8, illustrated is a system 800 that supports single and multiple axis emulation of a result of clamping the source visual object 502 onto a fill area. The source visual object 502, the fill area parameters 504, and the visual object parameters 506 can be inputted to the source fill component 510, which can identify a source sub-region of a canvas and fill the source sub-region of the canvas with the source visual object 502. The system 800 further includes an axis control component 802 that controls filling the fill area outside the source sub-region on one axis or two axes (e.g., whether the fill area outside the source sub-region is filled with supplemental visual object(s) on one axis or two axes to emulate clamp mode). For example, the axis control component 802 can receive an input parameter that specifies clamp mode emulation on one axis or two axes. Moreover, for one axis clamp mode emulation, the input parameter can specify horizontal (e.g., x axis) clamp mode emulation or vertical (e.g., y axis) clamp mode emulation.

The axis control component 802 can manage operation of the partition component 512, the supplement generation component 514, the clip component 518, the bounds evaluation component 702, the supplement fill component 516, and/or the canvas clip component 704 to emulate clamp mode on one axis or two axes. For example, for clamp mode emulation on two axes, the axis control component 802 can manage operation within the system 800 to be substantially similar to operation described in the system 500 of FIG. 5 and/or the system 700 of FIG. 7. According to another example, the axis control component 802 can alter operation of one of more of the partition component 512, the supplement generation component 514, the clip component 518, the bounds evaluation component 702, the supplement fill component 516, or the canvas clip component 704 for clamp mode emulation on one axis.

The following description illustrates an example of one axis clamp mode emulation controlled by the axis control component 802. The below example presents vertical clamp mode emulation. It is contemplated that horizontal clamp mode emulation can similarly be effectuated by the axis control component 802.

For vertical clamp mode emulation, the partition component 512 can form one or more extension sub-regions of the canvas by outwardly extending a left side and a right side of the source sub-region in cardinal directions. For example, an extension sub-region can be bounded by the perimeter of the fill area, the extended left side of the source sub-region, the top side of the source sub-region, and the extended right side of the source sub-region. According to another example, an extension sub-region can be bounded by the perimeter of the fill area, the extended left side of the source sub-region, the bottom side of the source sub-region, and the extended right side of the source sub-region. Thus, an extension sub-region created by the partition component 512 for vertical clamp mode emulation can be positioned in a cardinal direction along the y axis with respect to the source sub-region.

Moreover, the clip component 518 can generate one or more one-pixel high strip tiling clips. The supplement generation component 514 can generate respective supplemental visual objects corresponding to the one or more extension sub-regions by applying the one or more one-pixel high strip tiling clips on a top edge or a bottom edge of the source visual object 502. Further, the bounds evaluation component 702 can identify a perimeter of a bounding box of the fill area, and can generate respective estimates of the one or more extension sub-regions from the intersections of the extended left side and the extended right side of the source sub-region and the perimeter of the bounding box of the fill area. The supplement fill component 516 can fill the one or more respective estimates of the extension sub-regions positioned in respective cardinal directions along the y axis with respect to the source sub-region by repeating the respective supplemental visual objects to the perimeter of the bounding box of the fill area. Moreover, for example, the canvas clip component 704 can apply a clip that specifies a shape that bounds the respective estimates of the one or more extension sub-regions and the source sub-region to output the filled canvas 508. However, the claimed subject matter is not limited to the foregoing example where the canvas clip component 704 applied such a clip; rather, other clips applied by the canvas clip component 704 are intended to fall within the scope of the hereto appended claims. For example, the canvas clip component 704 can alternatively apply a clip that specifies a shape that bounds the extension sub-regions and the source sub-region, a clip that specifies a shape of the fill area (e.g., canvas clip), or the like.

The filled canvas 508 can be part of an electronic document. Moreover, the filled canvas 508 can be extended in the horizontal direction to fill the fill area using a different extend mode that is natively supported by an electronic document format. Accordingly, the system 800 supports emulating clamp mode on a first axis and employing an extend mode natively supported by the electronic document format on a second axis. Examples of a natively supported extend mode that can be used include a repeat extend mode (e.g., the filled canvas 508 is repeated on the x axis), a mirror extend mode (e.g., adjacent repetitions of the filled canvas 508 on the x axis are flipped horizontally), or no extend mode (e.g., the filled canvas 508 is not repeated). However, it is to be appreciated that other extend modes are intended to fall within the scope of the hereto appended claims.

FIGS. 9-13 illustrate another example of filling the exemplary canvas 100 to emulate a result of clamp mode in accordance with aspects described herein. The example set forth in FIGS. 9-13 depicts filling the fill area 102 of the canvas 100 with the source visual object 104 (e.g., from FIG. 1) and the supplemental visual objects generated from the source visual object. Moreover, the filled canvas 100 as shown in FIG. 4 results from the example illustrated in FIGS. 9-13. It is to be appreciated that the example described in FIGS. 9-13 is provided for illustration purposes, and is not intended to limit the scope of the hereto appended claims.

Figure 9:
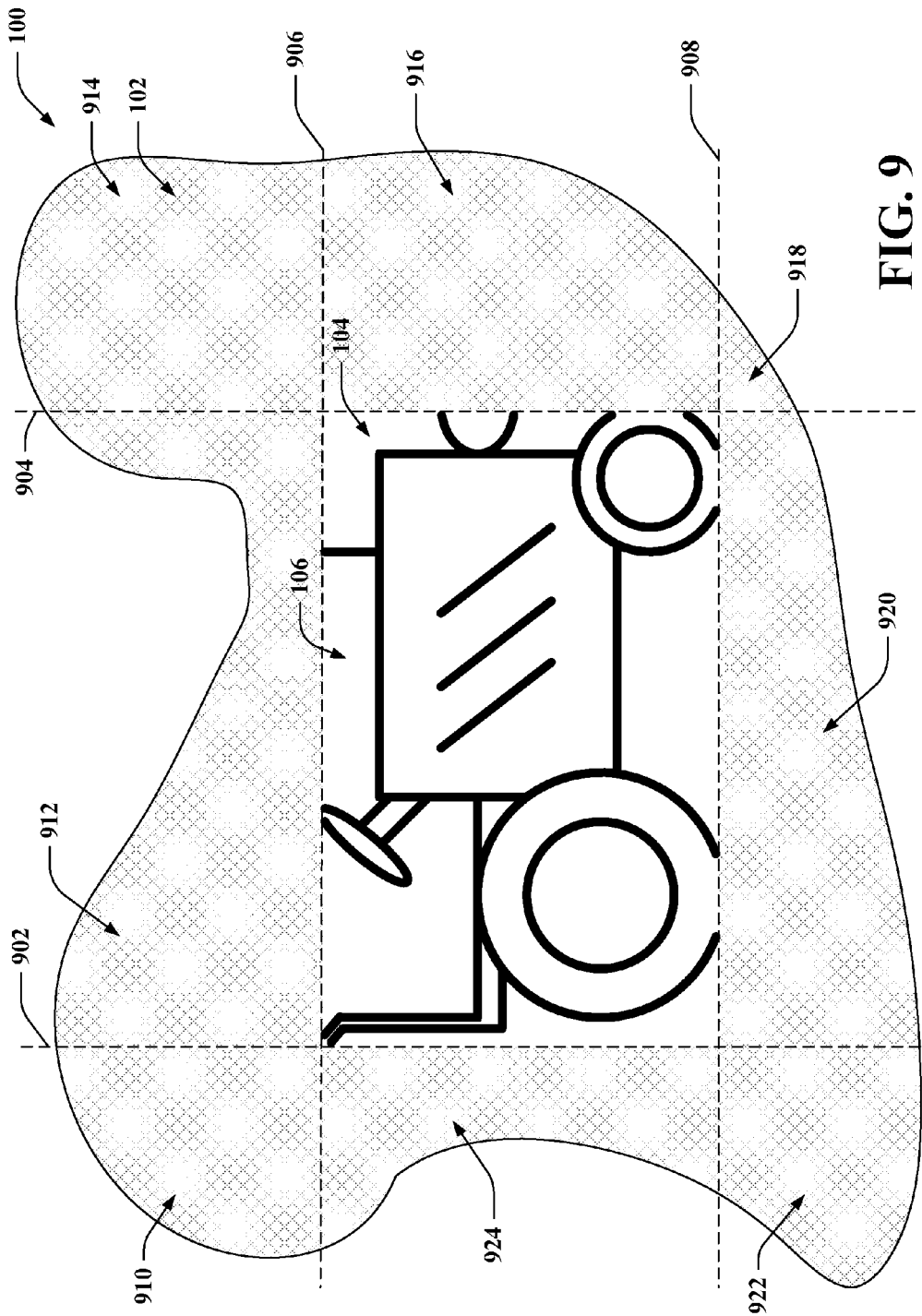
FIGS. 9-13 illustrate another example of filling the exemplary canvas to emulate a result of clamp mode in accordance with aspects described herein.

As shown in FIG. 9, sides (e.g., the left side 108, the right side 110, the top side 112, and the bottom side 114 of FIG. 1) of the source sub-region 106 are extended outwards in cardinal directions. More particularly, a left extended side 902, a right extended side 904, a top extended side 906, and a bottom extended side 908 are formed by extending the sides of the source sub-region 106. Moreover, intersections of extended sides and the perimeter of the fill area 102 define extension sub-regions. According to the example shown, eight extension sub-regions are formed on the canvas 100: extension sub-region 910, extension sub-region 912, extension sub-region 914, extension sub-region 916, extension sub-region 918, extension sub-region 920, extension sub-region 922, and extension sub-region 924. For instance, the extension sub-region 910 is bounded by the perimeter of the fill area 102, the left extended side 902, and the top extended side 906; the extension sub-region 912 is bounded by the perimeter of the fill area 102, the right extended side 904, the top extended side 906, and the left extended side 902; and so forth.

The eight extension sub-regions on the canvas 100 include four extension sub-regions positioned in a cardinal direction with respect to the source sub-region 106: namely, the extension sub-region 912, the extension sub-region 916, the extension sub-region 920, and the extension sub-region 924. Moreover, the eight extension sub-regions on the canvas 100 include four extension sub-regions positioned in a non-cardinal direction with respect to the source sub-region 106: namely, the extension sub-region 910, the extension sub-region 914, the extension sub-region 918, and the extension sub-region 922.

Figure 10:
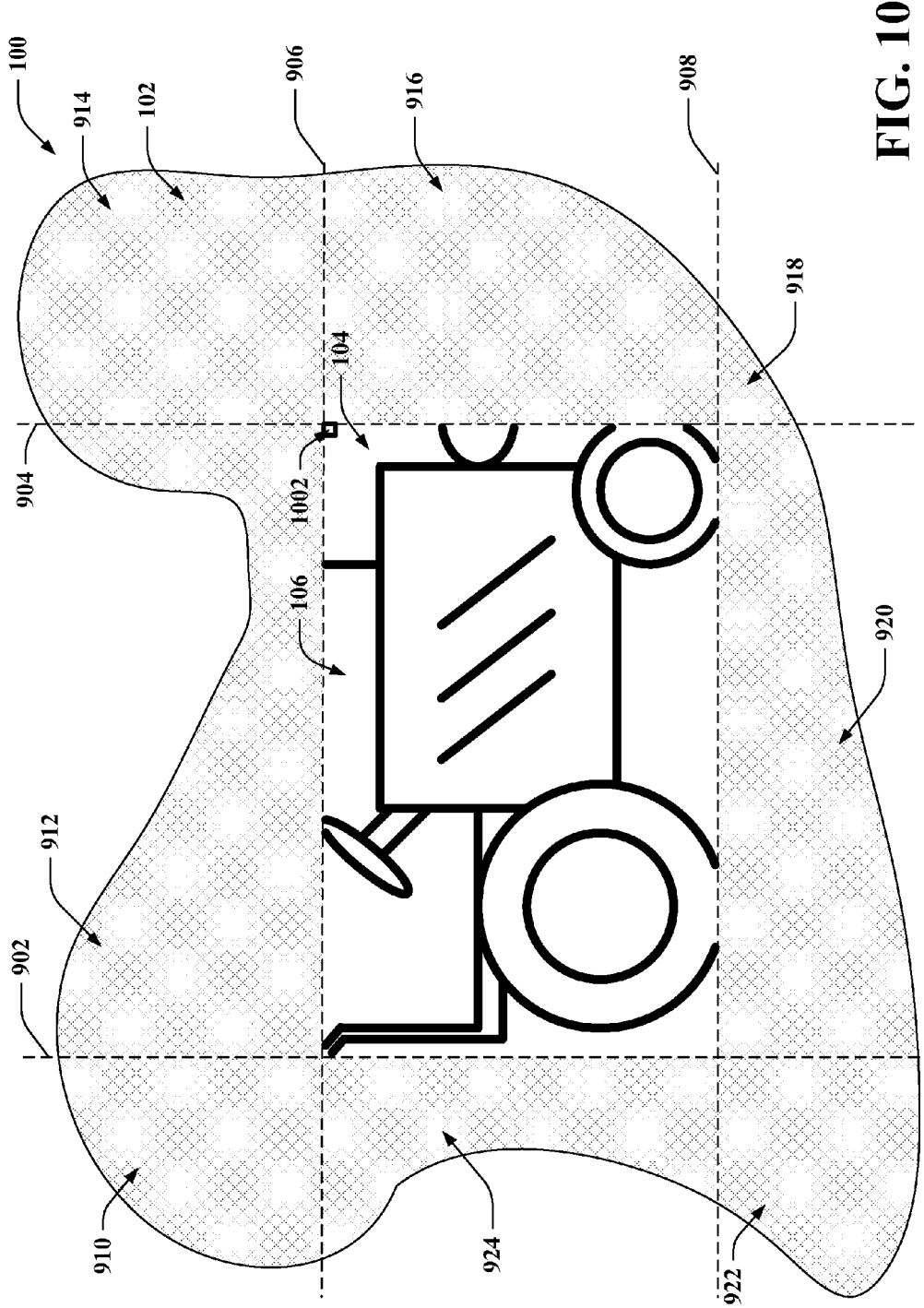

FIG. 10 illustrates a tiling clip 1002 applied to the source visual object 104. The tiling clip 1002 is a one-pixel high by one-pixel wide tiling clip that specifies a size of a portion of the source visual object 104 used as a supplemental visual object. A one-pixel high by one-pixel wide tiling clip can be utilized to create a supplemental visual object for filling an extension sub-region positioned in a non-cardinal direction with respect to the source sub-region 106. The supplemental visual object that fills the extension sub-region positioned in a non-cardinal direction with respect to the source sub-region 106 can be a portion of the source visual object 104 within the one-pixel high by one-pixel wide tiling clip.

The tiling clip 1002 is applied to a top-right corner of the source visual object 104 to generate a supplemental visual object used to fill the extension sub-region 914. Accordingly, the supplemental visual object generated using the tiling clip 1002 on the source visual object 104 refers to the portion of the source visual object 104 within the tiling clip 1002 at the top-right corner. Further, although not illustrated in FIG. 10, the extension sub-region 914 adjacent the location of the tiling clip 1002 can be filled by repeating the supplemental visual object generated using the tiling clip 1002 on the top-right corner of the source visual object 104 in two directions throughout the extension sub-region 614 (e.g., using tiling mode repeat-xy).

Although not shown, it is to be appreciated that a one-pixel high by one-pixel wide tiling clip similar to the tiling clip 1002 can similarly be applied to the top-left corner, the bottom left-corner, and the bottom-right corner of the source visual object 104 to generate supplemental visual objects used to fill the extension sub-region 910, the extension sub-region 918, and the extension sub-region 922, respectively. According to another example, it is to be appreciated that the tiling clip 1002 can be repositioned to generate the supplemental visual objects used to fill the extension sub-region 910, the extension sub-region 918, and the extension sub-region 922, respectively. For instance, repositioning the tiling clip 1002 can reduce a number of tiling clips that are generated, which can increase efficiency associated with filling the canvas 100.

Figure 11:
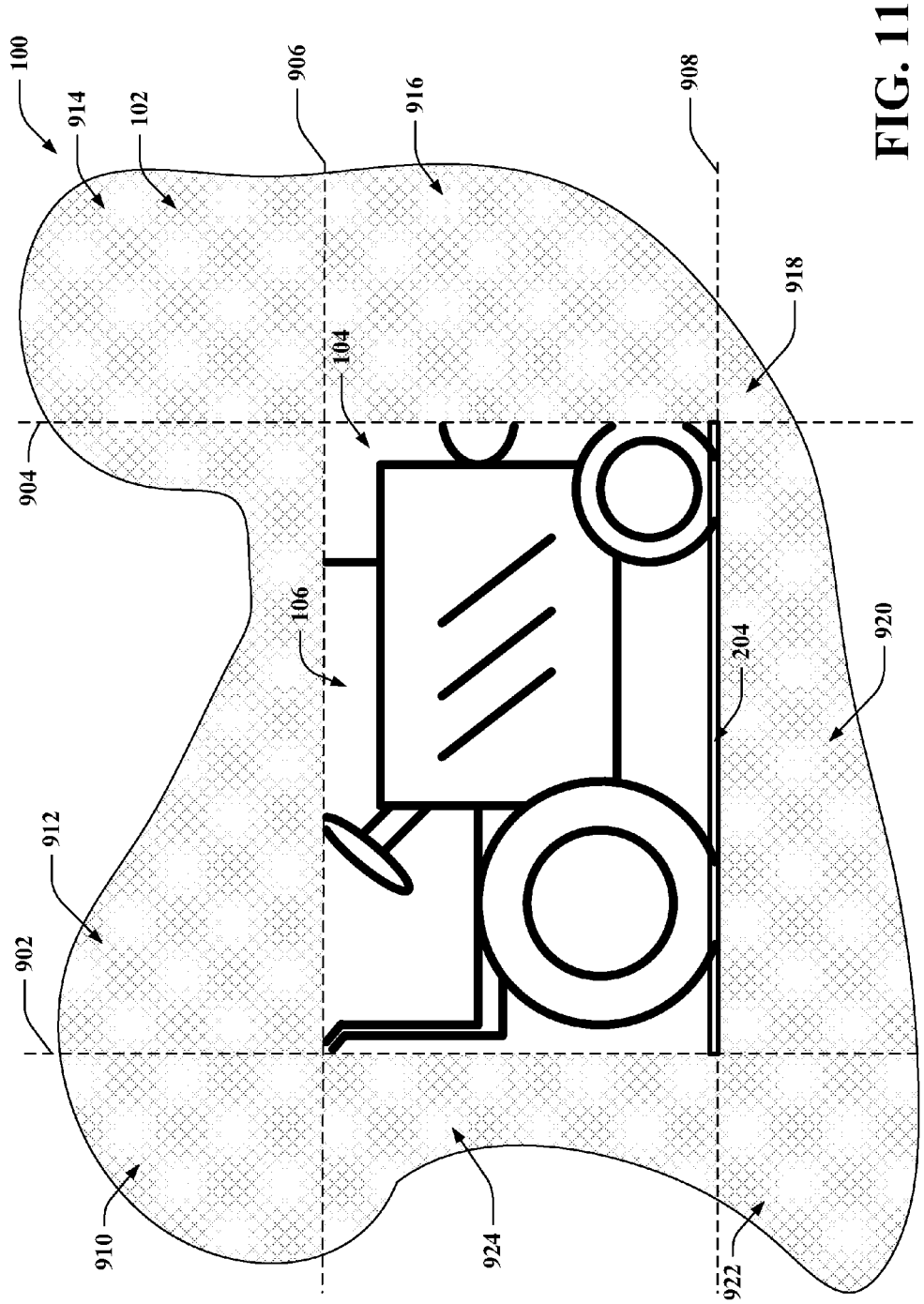

FIG. 11 illustrates a tiling clip 204 applied to a bottom edge of the source visual object 104. The tiling clip 204 is a one-pixel high strip tiling clip that extends across a width of the source sub-region 106. The tiling clip 204 is applied to the bottom edge of the source visual object 104 to generate a supplemental visual object used to fill the extension sub-region 920. Accordingly, the supplemental visual object generated using the tiling clip 204 on the source visual object 104 refers to the portion of the source visual object 104 within the tiling clip 204 at the bottom edge. Moreover, although not shown in FIG. 11, the extension sub-region 920 can be filled by repeating the supplemental visual object generated using the tiling clip 204 on the bottom edge of the source visual object 104 in a direction perpendicular to a side of the source sub-region 106 adjacent to the extension sub-region 920 (e.g., along a short axis of the tiling clip 204); thus, the supplemental visual object generated using the tiling clip 204 on the bottom edge of the source visual object 104 is repeated in a vertical direction (e.g., using tiling mode repeat-y).

Moreover, it is contemplated that a one-pixel high strip tiling clip similar to the tiling clip 204 can similarly be applied to a top edge of the source visual object 104 to generate a supplemental visual object used to fill the extension sub-region 912. According to another example, the tiling clip 204 can be repositioned to generate the supplemental visual object used to fill the extension sub-region 912.

Figure 12:
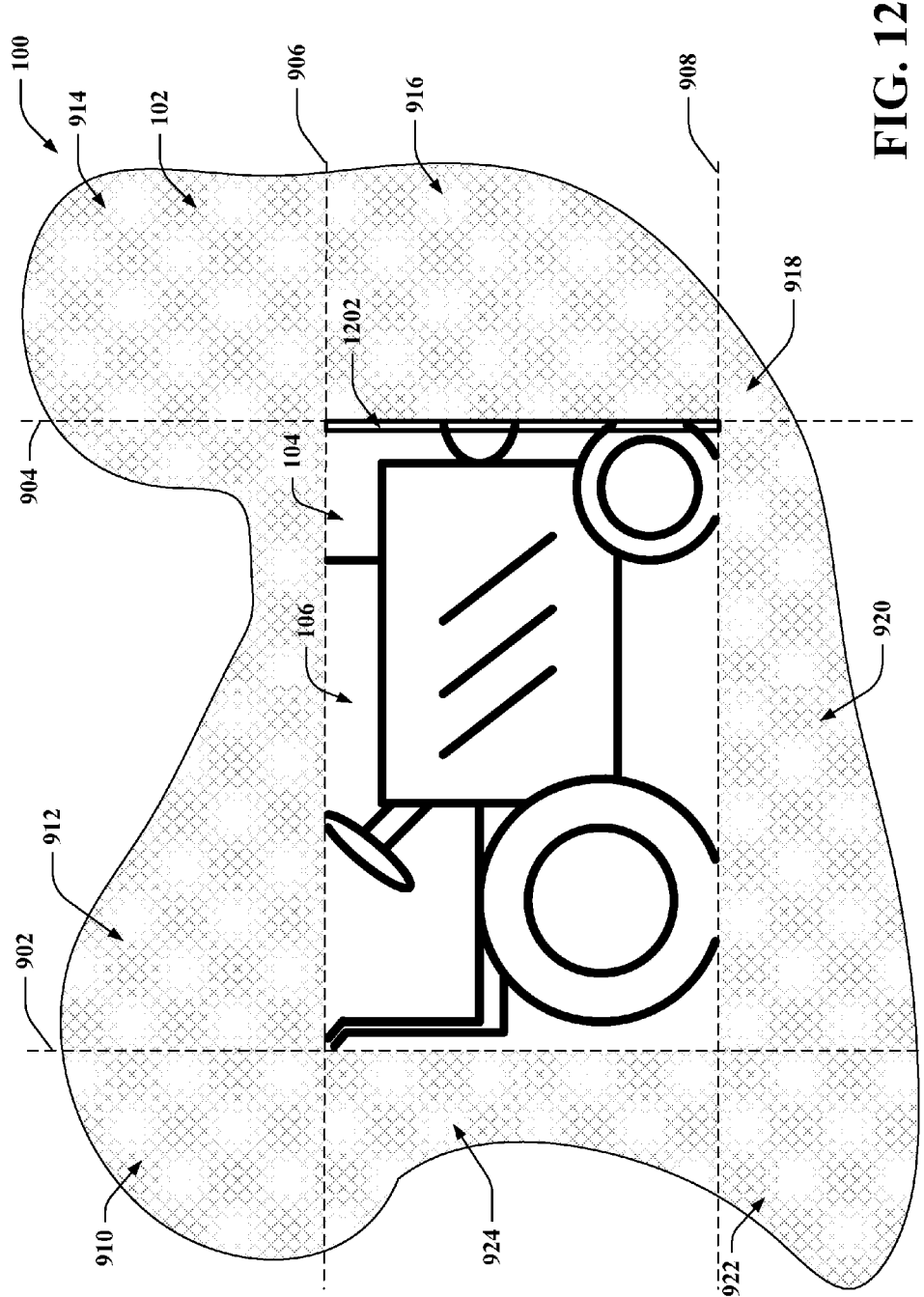

Turning to FIG. 12, illustrated is a tiling clip 1202 applied to a right edge of the source visual object 104. The tiling clip 1202 is a one-pixel wide strip tiling clip that extends across a height of the source sub-region 106. The tiling clip 1202 is applied to the right edge of the source visual object 104 to generate a supplemental visual object used to fill the extension sub-region 916. Thus, the supplemental visual object generated using the tiling clip 1202 on the source visual object 104 refers to the portion of the source visual object 104 within the tiling clip 1202 at the right edge. Further, although not shown in FIG. 12, the extension sub-region 916 can be filled by repeating the supplemental visual object generated using the tiling clip 1202 on the right edge of the source visual object 104 in a direction perpendicular to a side of the source sub-region 106 adjacent to the extension sub-region 916 (e.g., along a short axis of the tiling clip 1202); thus, the supplemental visual object generated using the tiling clip 1202 on the right edge of the source visual object 104 is repeated in a horizontal direction (e.g., using tiling mode repeat-x).

It is to be appreciated that a one-pixel wide strip tiling clip similar to the tiling clip 1202 can similarly be applied to a left edge of the source visual object 104 to generate a supplemental visual object used to fill the extension sub-region 924.

Pursuant to a further example, the tiling clip 1202 can be repositioned to generate the supplemental visual object used to fill the extension sub-region 924.

Figure 13:
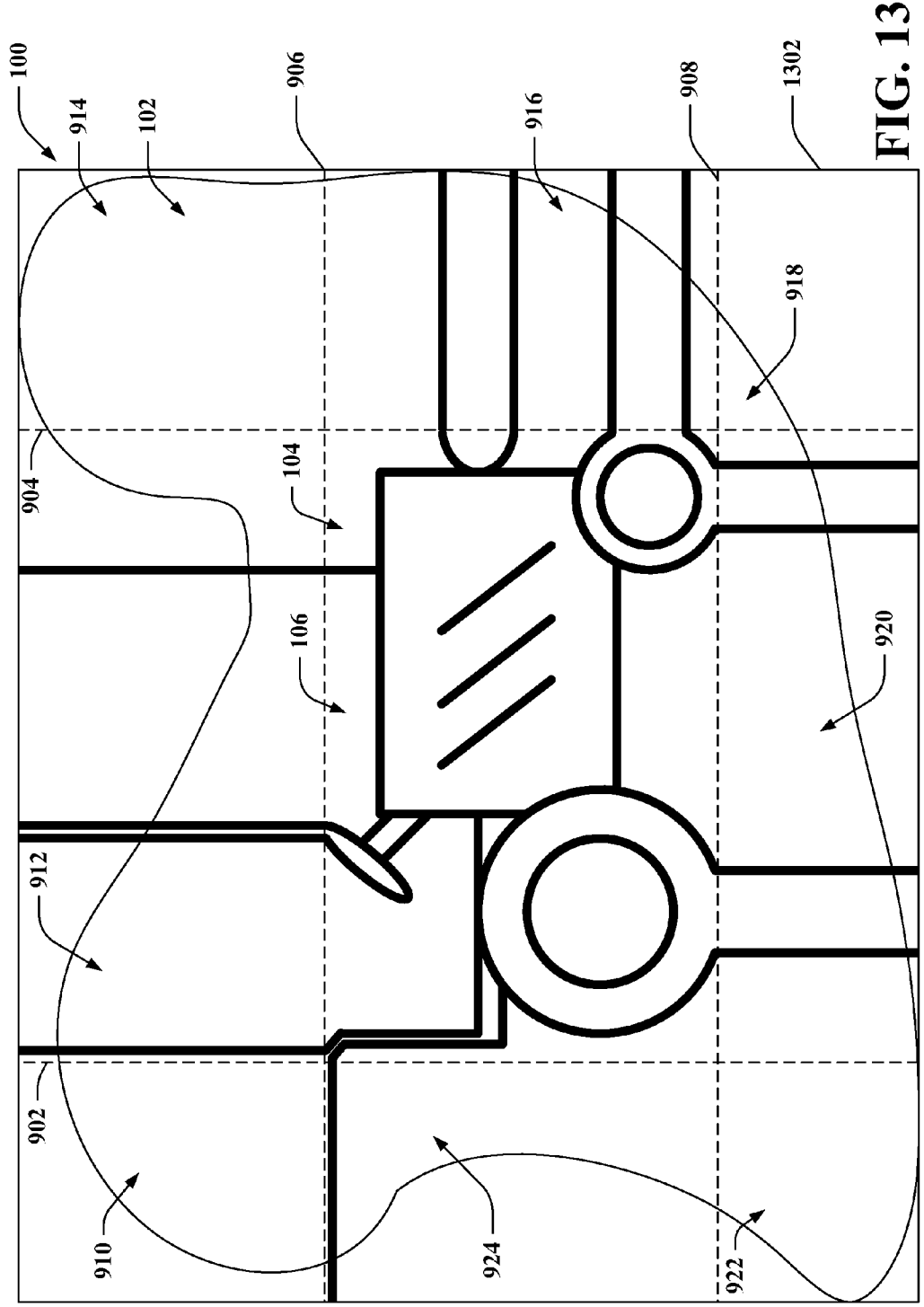

As depicted in FIG. 13, a perimeter of a bounding box 1302 of the fill area 102 can be identified. Estimates of the extension sub-regions can be generated from intersections of the identified perimeter of the bounding box 1302 and the left extended side 902, the right extended side 904, the top extended side 906, and the bottom extended side 908. For example, the extension sub-region 910 is estimated as being bounded by the identified perimeter of the bounding box 1302, the left extended side 902, and the top extended side 906; the extension sub-region 912 is estimated as being bounded by the identified perimeter of the bounding box 1302, the right extended side 904, the top extended side 906, and the left extended side 902; and so forth.

Moreover, the estimates of the extension sub-regions can be filled. According to an example, the estimate of the extension sub-region 914 is filled by repeating the supplemental visual object generated using the tiling clip 1002 of FIG. 10 on the top-right corner of the source visual object 104 in two directions (e.g., horizontally and vertically) throughout the estimate of the extension sub-region 914 to the perimeter of the bounding box 1302. By way of another example, the estimate of the extension sub-region 920 is filled by repeating the supplemental visual object generated using the tiling clip 204 of FIG. 11 on the bottom edge of the source visual object 104 in the vertical direction throughout the estimate of the extension sub-region 920 to the perimeter of the bounding box 1302. Pursuant to yet a further example, the estimate of the extension sub-region 916 is filled by repeating the supplemental visual object generated using the tiling clip 1202 of FIG. 12 on the right edge of the source visual object 104 in the horizontal direction throughout the estimate of the extension sub-region 916 to the perimeter of the bounding box 1302. Moreover, the remaining estimates of extension sub-regions can similarly be filled to the perimeter of the bounding box 1302.

Further, a canvas clip that specifies a shape of the fill area 102 can be applied to the canvas 100 with the filled estimates of the extension sub-regions. The canvas clip identifies the extension sub-regions (e.g., respective portions of the estimates of the extension sub-regions that are within the fill area 102). For example, the filled estimates of the extension sub-regions are clipped by the canvas clip such that the respective portions of the estimates of the extension sub-regions that are within the canvas clip are identified as being within the fill area 102. Thus, upon applying the canvas clip, the canvas 100 depicted in FIG. 4 is generated. For instance, the canvas 100 depicted in FIG. 4 includes the respective portions of the estimates of the extension sub-regions that are within the fill area 102.

Figure 14:
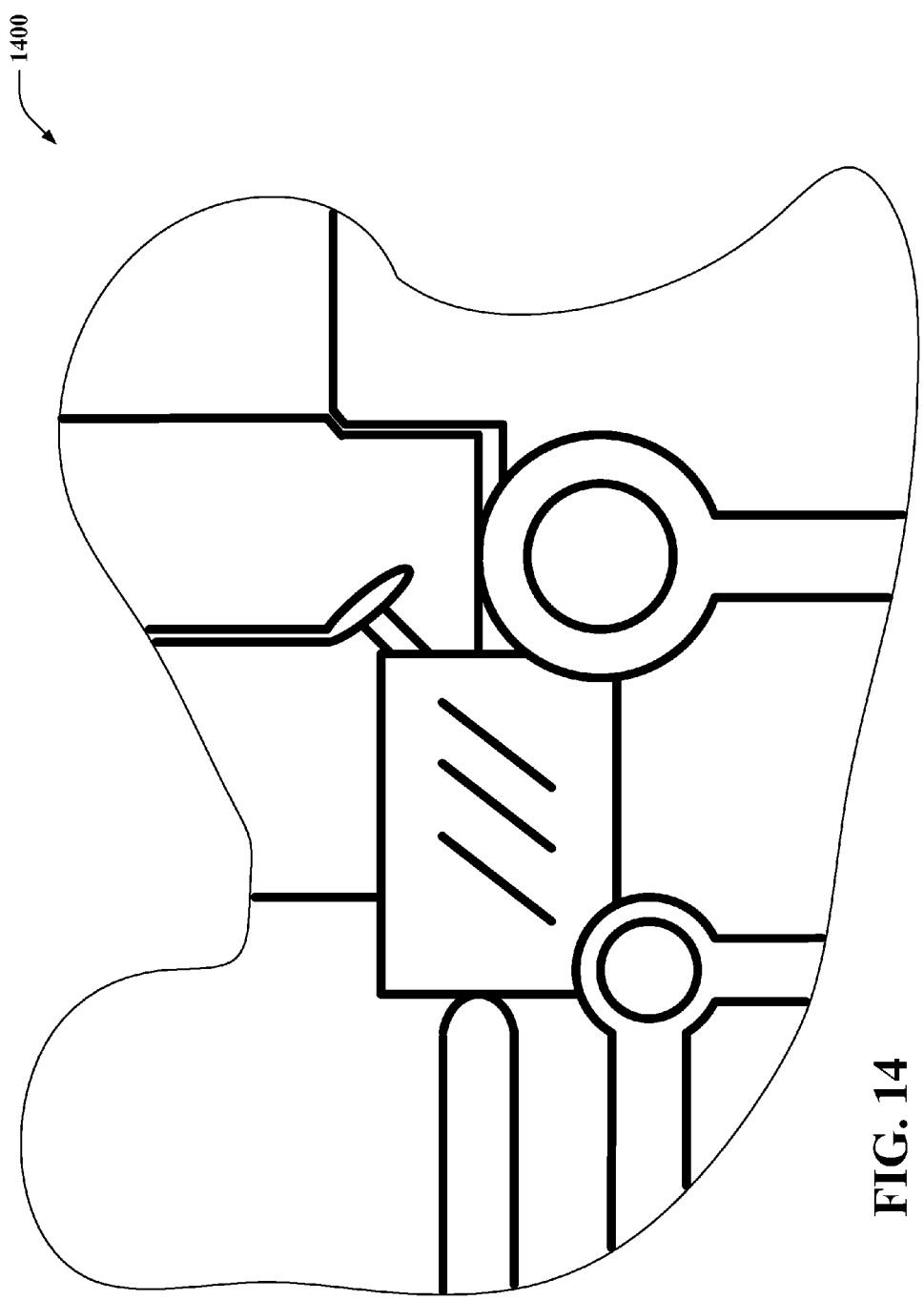
FIG. 14 illustrates an exemplary canvas that is generated upon applying a single transform to the canvas of FIG. 4.

FIG. 14 illustrates an exemplary canvas 1400 that is generated upon applying a single transform to the canvas 100 of FIG. 4. It is to be appreciated that the canvas 1400 is provided as an example, and the claimed subject matter is not so limited. As shown, the transform horizontally flipped the canvas 100 of FIG. 4. A transform can be applied to the canvas 100 rather than applying separate transforms to the visual objects included in the canvas 100. Although not shown, it is to be appreciated that other transforms can be applied to the canvas 100 of FIG. 4. Examples of transforms include resizing, vertically flipping, rotating, or the like; yet, it is to be appreciated that other transforms are intended to fall within the scope of the hereto appended claims.

Figure 15:
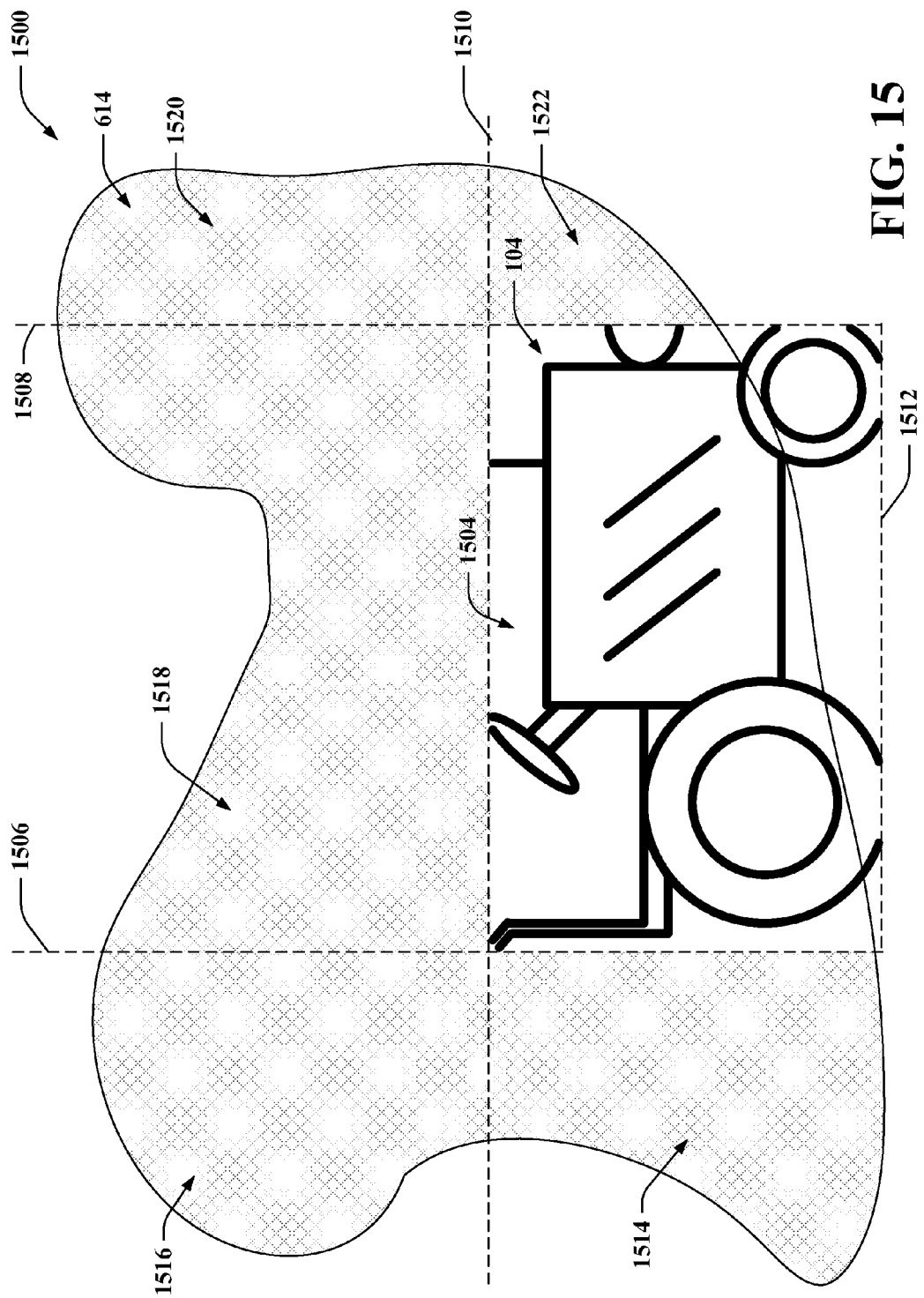
FIGS. 15-16 illustrate another exemplary canvas filled in accordance with various aspects described herein.
Figure 16:
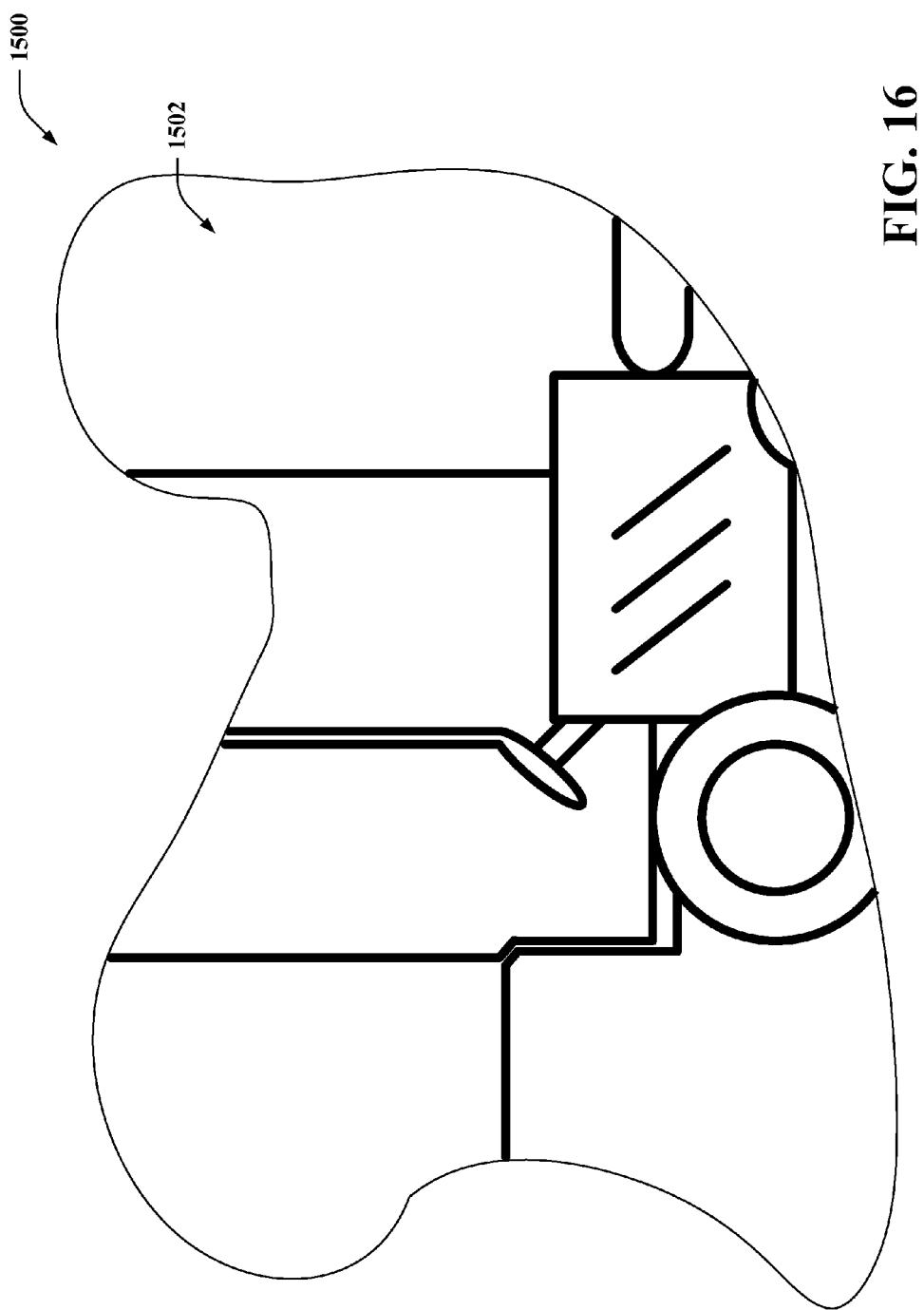

FIGS. 15-16 illustrate filling another exemplary canvas 1500 in accordance with various aspects described herein. The example set forth in FIGS. 15-16 depicts filling a fill area 1502 of the canvas 1500 with the source visual object 104 and supplemental visual objects generated from the source visual object 104, where the canvas 1500 includes a source sub-region 1504 that is partially outside the perimeter of the fill area 1502. The example set forth in FIGS. 15-16 is provided for illustration purposes, and it is contemplated that such example is not intended to limit the scope of the hereto appended claims.

As shown in FIG. 15, a left side, a right side, and a top side of the source sub-region 1504 are extended outwards in cardinal directions to form a left extended side 1506, a right extended side 1508, and a top extended side 1510. Moreover, a bottom side 1512 of the source sub-region 1504 is outside the perimeter of the fill area 1502 of the canvas 1500. Further, intersections of extended sides and the perimeter of the fill area 1502 define extension sub-regions. As depicted, five extension sub-regions are formed on the canvas 1500: extension sub-region 1514, extension sub-region 1516, extension sub-region 1518, extension sub-region 1520, and extension sub-region 1522. The extension sub-region 1514, the extension sub-region 1518, and the extension sub-region 1522 are positioned in cardinal directions with respect to the source sub-region 1504, and the extension sub-region 1516 and the extension sub-region 1520 are positioned in non-cardinal directions with respect to the source sub-region 1504.

Although not illustrated in FIG. 15, the extension sub-region 1514, the extension sub-region 1516, the extension sub-region 1518, the extension sub-region 1520, and the extension sub-region 1522 can be filled with respective supplemental visual objects generated from the source visual object 104 as described herein. As depicted in FIG. 16, the fill area 1502 of the canvas 1500 is filled with the source visual object (e.g., the source visual object 104) and supplemental visual objects generated from the source visual object. Moreover, the source sub-region is clipped (e.g., using a canvas clip) such that a portion within the perimeter of the fill area 1502 remains.

Figure 17:
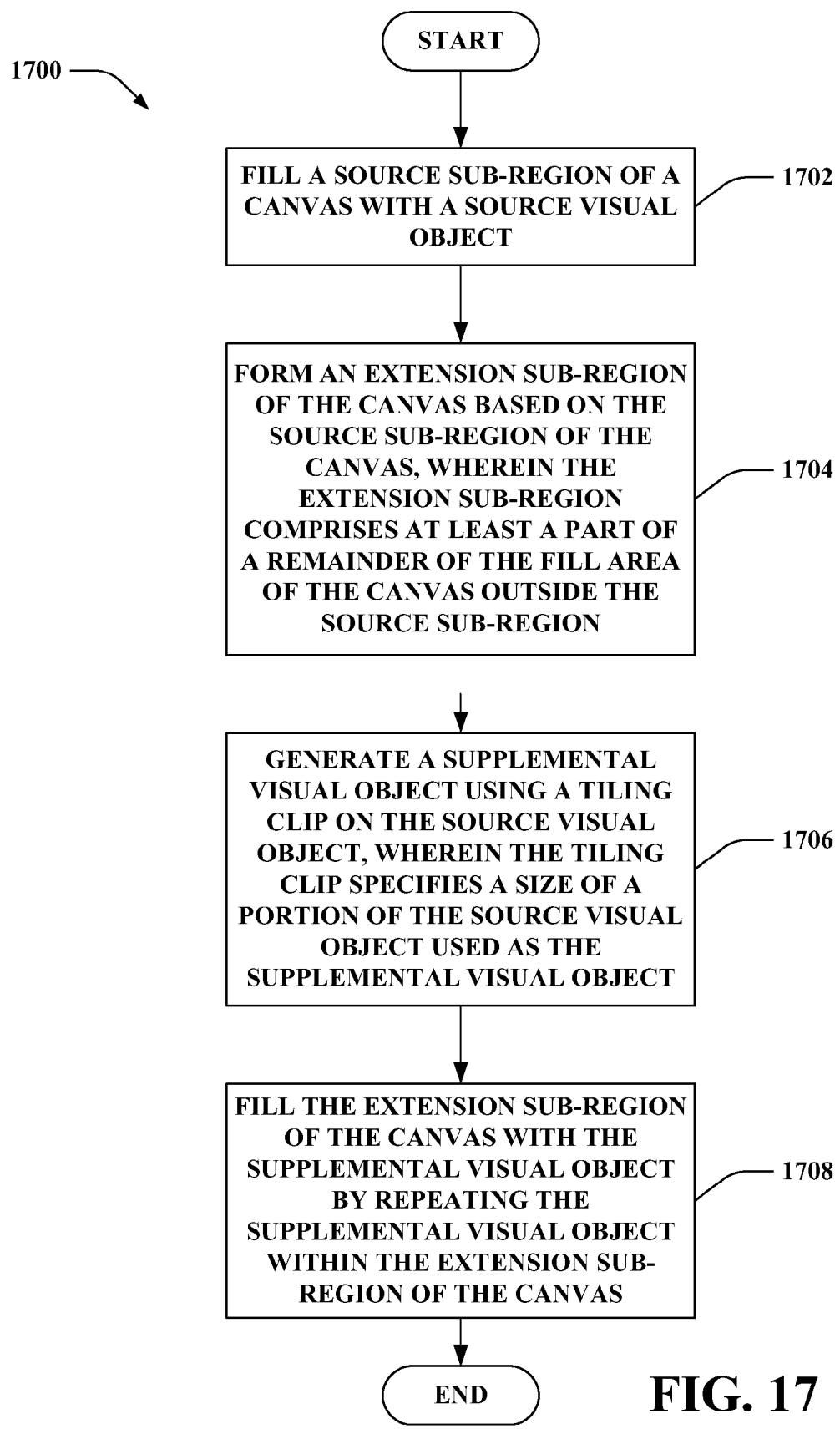
FIG. 17 is a flow diagram that illustrates an exemplary methodology for emulating a result of clamping a source visual object onto a fill area of a canvas.
Figure 18:
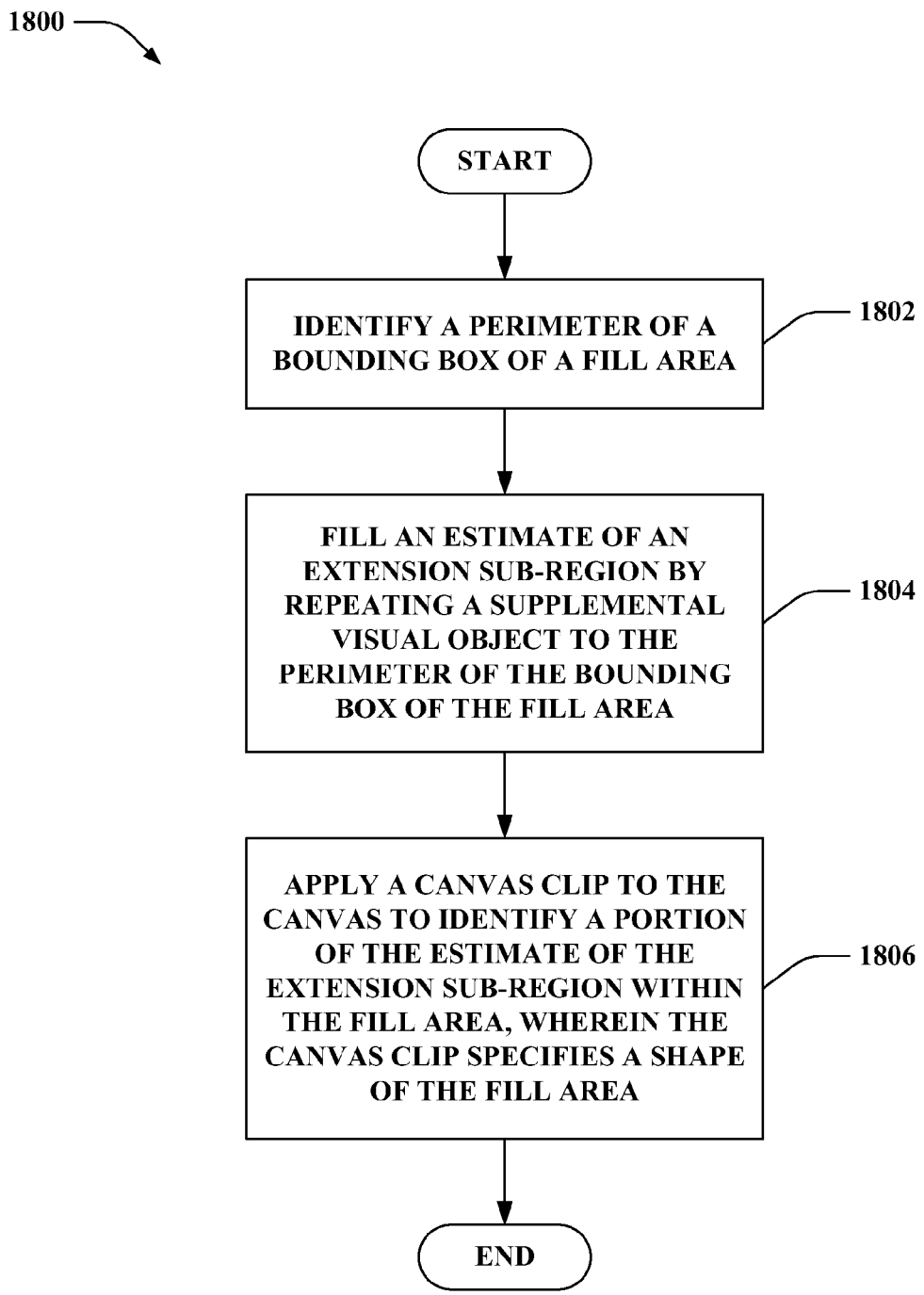
FIG. 18 is a flow diagram that illustrates an exemplary methodology for filling an extension sub-region of a canvas with a supplemental visual object.
Figure 19:
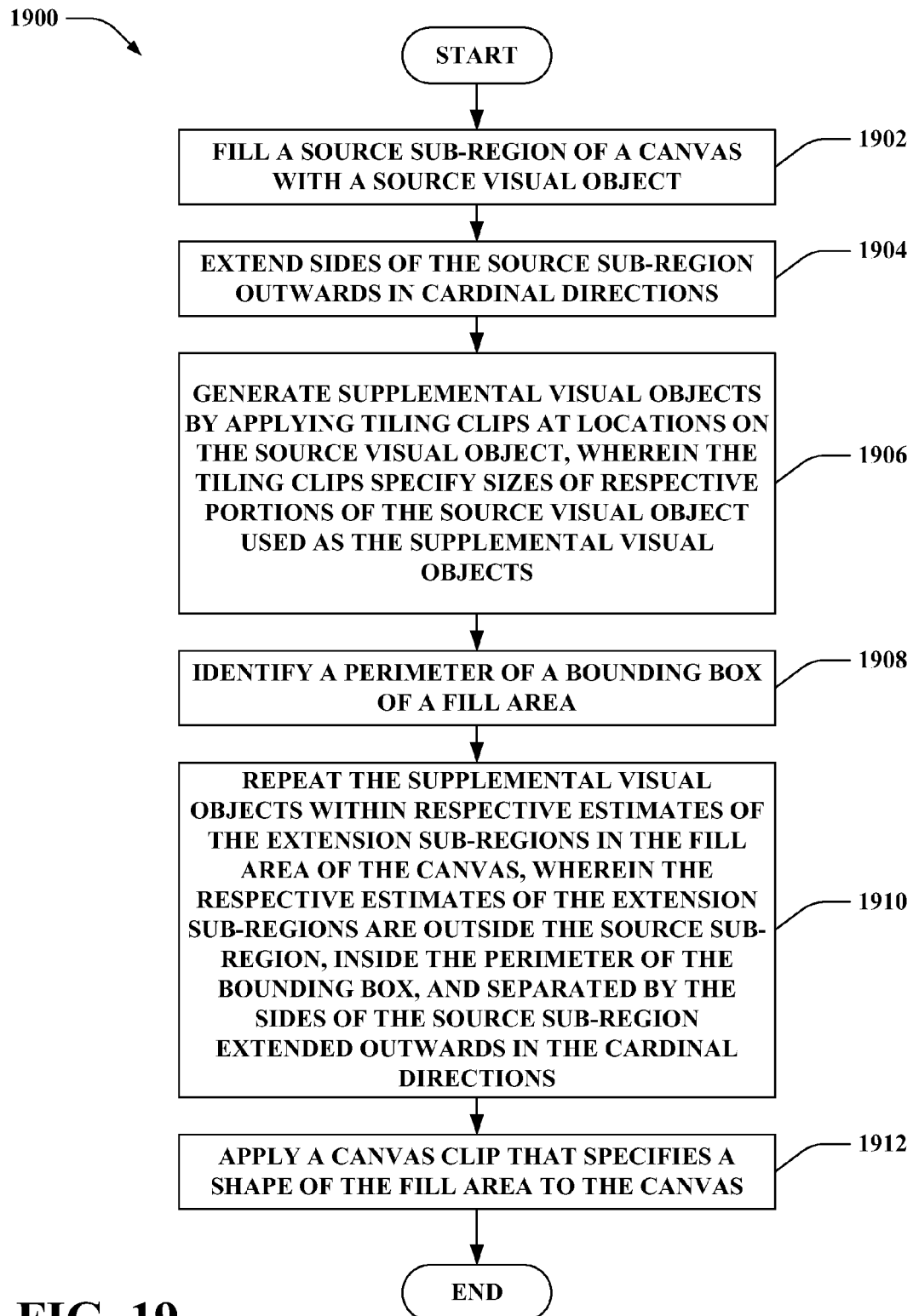
FIG. 19 is a flow diagram that illustrates an exemplary methodology for emulating a result of clamping a source visual object onto a fill area of a canvas.

FIGS. 17-19 illustrate exemplary methodologies relating to clamp mode emulation. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 17 illustrates a methodology 1700 for emulating a result of clamping a source visual object onto a fill area of a canvas. At 1702, a source sub-region of the canvas can be filled with the source visual object. For instance, the source visual object can comprise a set of vector elements. At 1704, an extension sub-region of the canvas can be formed based on the source sub-region of the canvas. The extension sub-region can comprise at least a part of a remainder of a fill area of the canvas outside the source sub-region. At 1706, a supplemental visual object can be generated using a tiling clip on the source visual object. The tiling clip can specify a size of a portion of the source visual object used as the supplemental visual object. At 1708, the extension sub-region of the canvas can be filled with the supplemental visual object by repeating the supplemental visual object within the extension sub-region of the canvas. By way of example, the source visual object and the supplemental visual object that fill the canvas can be maintained in a vector format as part of an electronic document. It is contemplated that the result of clamping the source visual object onto the fill area of the canvas can be emulated on one axis or two axes.

According to an example, the tiling clip can be a one-pixel high by one-pixel wide tiling clip. Following this example, the supplemental visual object can be generated by applying the one-pixel high by one-pixel wide tiling clip to a corner of the source visual object. Thus, the supplemental visual object can refer to a portion of the source visual object within the one-pixel high by one-pixel wide tiling clip positioned at the corner of the source visual object. Moreover, the extension sub-region can be filled with the supplemental visual object generated using the one-pixel high by one-pixel wide tiling clip, where the extension sub-region is positioned in a non-cardinal direction with respect to the source sub-region. Further, the supplemental visual object generated using the one-pixel high by one-pixel wide tiling clip can be repeated in two directions (e.g., horizontally and vertically) through the extension sub-region.

By way of another example, the tiling clip can be a one-pixel strip tiling clip (e.g., one-pixel high strip tiling clip or one-pixel wide strip tiling clip). In accordance with this example, the supplemental visual object can be generated by applying the one-pixel strip tiling clip to an edge of the source visual object. Hence, the supplemental visual object can refer to a portion of the source visual object within the one-pixel strip tiling clip positioned at the edge of the source visual object. Further, the extension sub-region can be filled with the supplemental visual object generated using the one-pixel strip tiling clip, where the extension sub-region is positioned in a cardinal direction with respect to the source sub-region. Moreover, the supplemental visual object generated using the one-pixel strip tiling clip can be repeated throughout the extension sub-region in a direction perpendicular to a side of the source sub-region adjacent to the extension sub-region.

Now turning to FIG. 18, illustrated is a methodology 1800 for filling an extension sub-region of a canvas with a supplemental visual object. At 1802, a perimeter of a bounding box of a fill area can be identified. At 1804, an estimate of the extension sub-region can be filled by repeating the supplemental visual object to the perimeter of the bounding box of the fill area. At 1806, a canvas clip can be applied to the canvas to identify a portion of the estimate of the extension sub-region within the fill area. The canvas clip, for instance, can specify a shape of the fill area.

With reference to FIG. 19, illustrated is a methodology 1900 for emulating a result of clamping a source visual object onto a fill area of a canvas. At 1902, a source sub-region of the canvas can be filled with the source visual object. At 1904, sides of the source sub-region can be extended outwards in cardinal directions. At 1906, supplemental visual objects can be generated by applying tiling clips at locations on the source visual object. The tiling clips can specify sizes of respective portions of the source visual object used as the supplemental visual objects. At 1908, a perimeter of a bounding box of a fill area can be identified. At 1910, the supplemental visual objects can be repeated within respective estimates of the extension sub-regions in the fill area of the canvas. The respective estimates of the extension sub-regions can be outside the source sub-region, inside the perimeter of the bounding box, and separated by the sides of the source sub-region extended outwards in the cardinal directions. At 1912, a canvas clip that specifies a shape of the fill area can be applied to the canvas.

Figure 20:
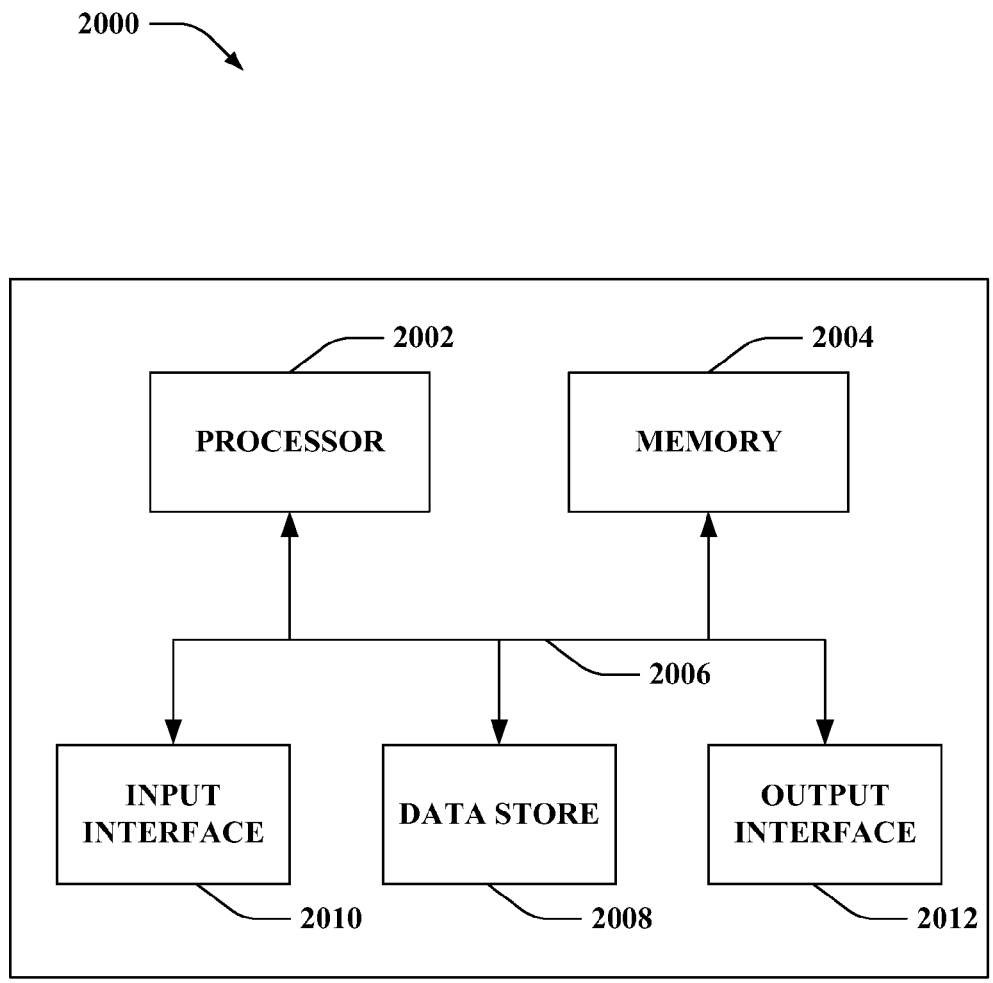
FIG. 20 illustrates an exemplary computing device.

Referring now to FIG. 20, a high-level illustration of an exemplary computing device 2000 that can be used in accordance with the systems and methodologies disclosed herein is illustrated. For instance, the computing device 2000 may be used in a system that emulates a result of clamping a source visual object onto a fill area by filling a canvas with at least the source visual object and a supplemental visual object that refers to a portion of the source visual object. By way of another example, the computing device 2000 can be used in a system that forms an extension sub-region of the canvas, which comprises at least a part of a remainder of a fill area outside a source sub-region filled with the source visual object, generates a supplemental visual object that refers to the source visual object, and fills the extension sub-region with the supplemental visual object. The computing device 2000 includes at least one processor 2002 that executes instructions that are stored in a memory 2004. The instructions may be, for instance, instructions for implementing functionality described as being carried out by one or more components discussed above or instructions for implementing one or more of the methods described above. The processor 2002 may access the memory 2004 by way of a system bus 2006. In addition to storing executable instructions, the memory 2004 may also store a canvas, visual object(s) that fill the canvas, parameters, electronic documents, and so forth.

The computing device 2000 additionally includes a data store 2008 that is accessible by the processor 2002 by way of the system bus 2006. The data store 2008 may include executable instructions, a canvas, visual object(s) that fill the canvas, parameters, electronic documents, etc. The computing device 2000 also includes an input interface 2010 that allows external devices to communicate with the computing device 2000. For instance, the input interface 2010 may be used to receive instructions from an external computer device, from a user, etc. The computing device 2000 also includes an output interface 2012 that interfaces the computing device 2000 with one or more external devices. For example, the computing device 2000 may display text, images, etc. by way of the output interface 2012.

Additionally, while illustrated as a single system, it is to be understood that the computing device 2000 may be a distributed system. Thus, for instance, several devices may be in communication by way of a network connection and may collectively perform tasks described as being performed by the computing device 2000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of emulating a result of clamping a source visual object onto a fill area of a canvas in an electronic document, comprising:
    filling a source sub-region of the canvas with the source visual object, wherein the source visual object comprises a set of vector elements and the source visual object is maintained in a vector format without rasterization when appended to the canvas in the electronic document;
    forming an extension sub-region of the canvas based on the source sub-region of the canvas, wherein the extension sub-region comprises at least a part of a remainder of the fill area of the canvas outside the source sub-region;
    causing a processor to generate a supplemental visual object using a tiling clip on at least one of an edge or a corner of the source visual object, wherein the tiling clip specifies a size of a portion of the source visual object used as the supplemental visual object; and
    filling the extension sub-region of the canvas with the supplemental visual object by repeating the supplemental visual object within the extension sub-region of the canvas, wherein the supplemental visual object refers to the source visual object and is maintained in the vector format without rasterization when appended to the canvas in the electronic document.

2. The method of claim 1, further comprising:
    generating the supplemental visual object by applying a one-pixel high by one-pixel wide tiling clip to the corner of the source visual object; and
    filling the extension sub-region with the supplemental visual object generated using the one-pixel high by one-pixel wide tiling clip, wherein the extension sub-region is positioned in a non-cardinal direction with respect to the source sub-region.

3. The method of claim 2, wherein filling the extension sub-region with the supplemental visual object generated using the one-pixel high by one-pixel wide tiling clip further comprises repeating the supplemental visual object generated using the one-pixel high by one-pixel wide tiling clip in two directions throughout the extension sub-region.

4. The method of claim 1, further comprising:
    generating the supplemental visual object by applying a one-pixel strip tiling clip to the edge of the source visual object; and
    filling the extension sub-region with the supplemental visual object generated using the one-pixel strip tiling clip, wherein the extension sub-region is positioned in a cardinal direction with respect to the source sub-region.

5. The method of claim 4, wherein filling the extension sub-region with the supplemental visual object generated using the one-pixel strip tiling clip further comprises repeating the supplemental visual object generated using the one-pixel strip tiling clip throughout the extension sub-region in a direction perpendicular to a side of the source sub-region adjacent to the extension sub-region.

6. The method of claim 1, further comprising dividing the remainder of the fill area of the canvas outside the source sub-region into a plurality of extension sub-regions by outwardly extending sides of the source sub-region in cardinal directions, wherein the plurality of extension sub-regions comprises the extension sub-region.

7. The method of claim 6, further comprising:
    generating respective supplemental visual objects that correspond to the plurality of extension sub-regions using a set of tiling clips on the source visual object; and
    filling the plurality of extension sub-regions with the respective supplemental visual objects by repeating the respective supplemental visual objects within the plurality of extension sub-regions.

8. The method of claim 7, wherein each of the respective supplemental visual objects is generated using a disparate tiling clip from the set of tiling clips on the source visual object.

9. The method of claim 7, wherein at least two of the respective supplemental visual objects are generated using a common tiling clip from the set of tiling clips on the source visual object.

10. The method of claim 1, wherein filling the extension sub-region of the canvas with the supplemental visual object further comprises:
    identifying a perimeter of a bounding box of the fill area;
    filling an estimate of the extension sub-region by repeating the supplemental visual object to the perimeter of the bounding box of the fill area; and
    applying a canvas clip to the canvas to identify a portion of the estimate of the extension sub-region within the fill area, wherein the canvas clip specifies a shape of the fill area.

11. The method of claim 1, wherein the result of clamping the source visual object onto the fill area of the canvas is emulated on one axis.

12. The method of claim 1, further comprising:
rendering graphics on a display using a two dimensional graphics application programming interface (API) that includes a set of rules that rasterize the source visual object and extend edge values and colors from the rasterized source visual object to a perimeter of the fill area; and
converting the graphics rendered on the display to the electronic document having a format that lacks the set of rules that rasterize the source visual object and extend the edge values and the colors from the rasterized source visual object to the perimeter of the fill area, wherein converting the graphics rendered on the display to the electronic document further comprises:
filling the source sub-region of the canvas with the source visual object;
forming the extension sub-region of the canvas based on the source sub-region of the canvas;
generating the supplemental visual object using a tiling clip on the source visual object; and
filling the extension sub-region of the canvas with the supplemental visual object.

13. A system that emulates a result of clamping a source visual object onto a fill area of a canvas in an electronic document, comprising:
a processor; and
a memory that comprises components that are executable by the processor, the components comprising:
a source fill component that fills a source sub-region of the canvas with the source visual object, wherein the source visual object comprises a set of vector elements and the source visual object is maintained in a vector format without being rasterized when appended to the canvas in the electronic document;
a partition component that forms an extension sub-region within the fill area of the canvas based on the source sub-region of the canvas;
a supplement generation component that creates a supplemental visual object that refers to a portion of the source visual object filled onto the source sub-region of the canvas, wherein the portion of the source visual object comprises at least one of an edge or a corner of the source visual object; and
a supplement fill component that repeats the supplemental visual object within the extension sub-region of the canvas, wherein the supplemental visual object is maintained in the vector format without being rasterized when appended to the canvas in the electronic document.

14. The system of claim 13, further comprising a clip component that generates one or more tiling clips as a function of the source sub-region.

15. The system of claim 14, the supplement generation component selects a particular tiling clip from the one or more tiling clips and applies the particular tiling clip to a particular location of the source visual object to create the supplemental visual object as a function of a relative position of the extension sub-region to be filled with the supplemental visual object with respect to the source sub-region.

16. The system of claim 14, wherein the one or more tiling clips include at least one of a one-pixel high by one-pixel wide tiling clip, a one-pixel wide strip tiling clip, or a one-pixel high strip tiling clip.

17. The system of claim 13, further comprising:
a bounds evaluation component that identifies a perimeter of a bounding box of the fill area and generates an estimate of the extension sub-region of the canvas based on the perimeter of the bounding box of the fill area, wherein the supplement fill component repeats the supplemental visual object within the estimate of the extension sub-region of the canvas to the perimeter of the bounding box of the fill area; and
a canvas clip component that applies a canvas clip that specifies a shape of the fill area to the canvas.

18. The system of claim 13, further comprising an axis control component that controls filling the fill area outside the source sub-region on one axis.

19. The system of claim 13, wherein the electronic document has a format that lacks a set of rules that rasterize the source visual object and extend edge values and colors from the source visual object as rasterized to a perimeter of the fill area.

20. A computer-readable storage medium including computer-executable instructions that, when executed by a processor, cause the processor to perform acts including:
filling a source sub-region of a canvas with a source visual object, wherein the source visual object is received in a vector format and maintained in the vector format without rasterization when appended to the canvas in an electronic document;
extending sides of the source sub-region outwards in cardinal directions;
generating supplemental visual objects by applying tiling clips at locations on the source visual object, wherein the tiling clips specify sizes of respective portions of the source visual object used as the supplemental visual objects, and wherein a portion of the source visual object comprises one of an edge or a corner of the source visual object;
identifying a perimeter of a bounding box of a fill area;
repeating the supplemental visual objects within respective estimates of extension sub-regions in the fill area of the canvas, wherein the respective estimates of the extension sub-regions are outside the source sub-region, inside the perimeter of the bounding box, and separated by the sides of the source sub-region extended outwards in the cardinal directions, and wherein the supplemental visual objects are maintained in the vector format without rasterization when appended to the canvas in the electronic document; and
applying a canvas clip that specifies a shape of the fill area to the canvas.

* * * * *